United States Patent
Kanai et al.

(10) Patent No.: US 10,725,675 B2
(45) Date of Patent: Jul. 28, 2020

(54) MANAGEMENT APPARATUS, INFORMATION PROCESSING APPARATUS, MANAGEMENT METHOD, AND COMPUTER PROGRAM PRODUCT

(71) Applicant: Kabushiki Kaisha Toshiba, Minato-ku (JP)

(72) Inventors: Tatsunori Kanai, Yokohama (JP); Yusuke Shirota, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 103 days.

(21) Appl. No.: 16/121,337

(22) Filed: Sep. 4, 2018

(65) Prior Publication Data

US 2019/0286347 A1 Sep. 19, 2019

(30) Foreign Application Priority Data

Mar. 19, 2018 (JP) .................. 2018-050512
Mar. 19, 2018 (JP) .................. 2018-051309

(51) Int. Cl.
*G06F 12/00* (2006.01)
*G06F 13/00* (2006.01)
*G06F 3/06* (2006.01)

(52) U.S. Cl.
CPC .......... *G06F 3/0622* (2013.01); *G06F 3/068* (2013.01); *G06F 3/0647* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 9,229,870 B1* | 1/2016 | Kumar | G06F 11/34 |
| 2011/0185106 A1* | 7/2011 | Yano | G06F 11/1471 |
| | | | 711/103 |
| 2011/0289352 A1* | 11/2011 | Lee | G06F 11/1441 |
| | | | 714/20 |
| 2016/0378652 A1 | 12/2016 | Takeda et al. | |

(Continued)

FOREIGN PATENT DOCUMENTS

JP 2015-184794 10/2015

OTHER PUBLICATIONS

Patterson. D. et al. "Computer Organization and Design RISC-V Edition," Morgan Kaufmann Publishers, ISBN 978-0-12-812275-4. 5.7 Virtual Memory, 2018. pp. 818-857.

*Primary Examiner* — Sean D Rossiter
(74) *Attorney, Agent, or Firm* — Oblon, McClelland, Maier & Neustadt, L.L.P.

(57) ABSTRACT

According to an embodiment, a management apparatus manages access to a plurality of types of storage units by a processing circuit. Each of the plurality of types of storage units includes a plurality of first regions, and each of the plurality of first regions includes a plurality of second regions. The management apparatus includes a circuitry configured to function as a management unit. The management unit manages a management table in which identification information of one or more of the plurality of first regions and access management information defining access information indicating whether or not each second region included in the one or more of the plurality of first regions is accessed by the processing circuit are associated with each other.

20 Claims, 20 Drawing Sheets

(56) References Cited

U.S. PATENT DOCUMENTS

2018/0267720 A1\* 9/2018 Goldberg .............. G06F 3/0619
2019/0130102 A1\* 5/2019 Johnson .............. G06F 12/1027
2019/0347016 A1\* 11/2019 Yano ........................ G11C 7/20

\* cited by examiner

| PAGE NUMBER (IDENTIFICATION INFORMATION) | ACCESS MANAGEMENT INFORMATION | | | | | | | | | | | | | | |
|---|---|---|---|---|---|---|---|---|---|---|---|---|---|---|---|
| 0f06438b | 0 | 0 | 1 | 0 | 1 | 0 | 0 | 0 | 0 | 0 | 0 | 0 | 0 | 1 | 1 |
| 0e8c29f1 | 1 | 1 | 1 | 1 | 1 | 1 | 1 | 1 | 1 | 0 | 0 | 0 | 0 | 0 | 0 |
| 0003056f | 0 | 0 | 1 | 1 | 1 | 0 | 0 | 0 | 0 | 0 | 0 | 0 | 0 | 0 | 0 |
| 0036dd90 | 0 | 0 | 0 | 0 | 1 | 1 | 0 | 1 | 1 | 0 | 1 | 0 | 0 | 0 | 0 |
| 00401f3a | 1 | 0 | 0 | 1 | 0 | 0 | 1 | 0 | 0 | 1 | 0 | 0 | 0 | 0 | 0 |
| 0e8c29e7 | 1 | 1 | 1 | 1 | 1 | 1 | 1 | 1 | 1 | 1 | 1 | 1 | 1 | 1 | 1 |
| 048f38dc | 0 | 0 | 0 | 0 | 0 | 0 | 1 | 0 | 0 | 1 | 0 | 0 | 0 | 0 | 0 |
| 000028fd | 0 | 0 | 0 | 0 | 0 | 0 | 0 | 0 | 0 | 0 | 1 | 1 | 0 | 0 | 0 |

| LOGICAL ADDRESS | PHYSICAL ADDRESS | ACCESS MANAGEMENT INFORMATION | | | | | | | | | | | | | | |
|---|---|---|---|---|---|---|---|---|---|---|---|---|---|---|---|---|
| | | 0 | 0 | 1 | 0 | 1 | 0 | 0 | 0 | 0 | 0 | 0 | 0 | 0 | 0 | 1 | 1 |
| | | 1 | 1 | 1 | 1 | 1 | 1 | 1 | 1 | 1 | 0 | 0 | 0 | 0 | 0 | 0 | 0 |
| | | 0 | 0 | 1 | 1 | 1 | 0 | 0 | 0 | 0 | 0 | 0 | 0 | 0 | 0 | 0 | 0 |
| | | 0 | 0 | 0 | 0 | 1 | 1 | 0 | 1 | 1 | 0 | 1 | 0 | 0 | 0 | 0 | 0 |
| | | 1 | 0 | 0 | 1 | 0 | 0 | 1 | 0 | 0 | 1 | 0 | 0 | 0 | 0 | 0 | 0 |
| | | 1 | 1 | 1 | 1 | 1 | 1 | 1 | 1 | 1 | 1 | 1 | 1 | 1 | 1 | 1 | 1 |
| | | 0 | 0 | 0 | 0 | 0 | 0 | 1 | 0 | 0 | 1 | 0 | 0 | 0 | 0 | 0 | 0 |
| | | 0 | 0 | 0 | 0 | 0 | 0 | 0 | 0 | 0 | 0 | 1 | 1 | 0 | 0 | 0 | 0 |

30B

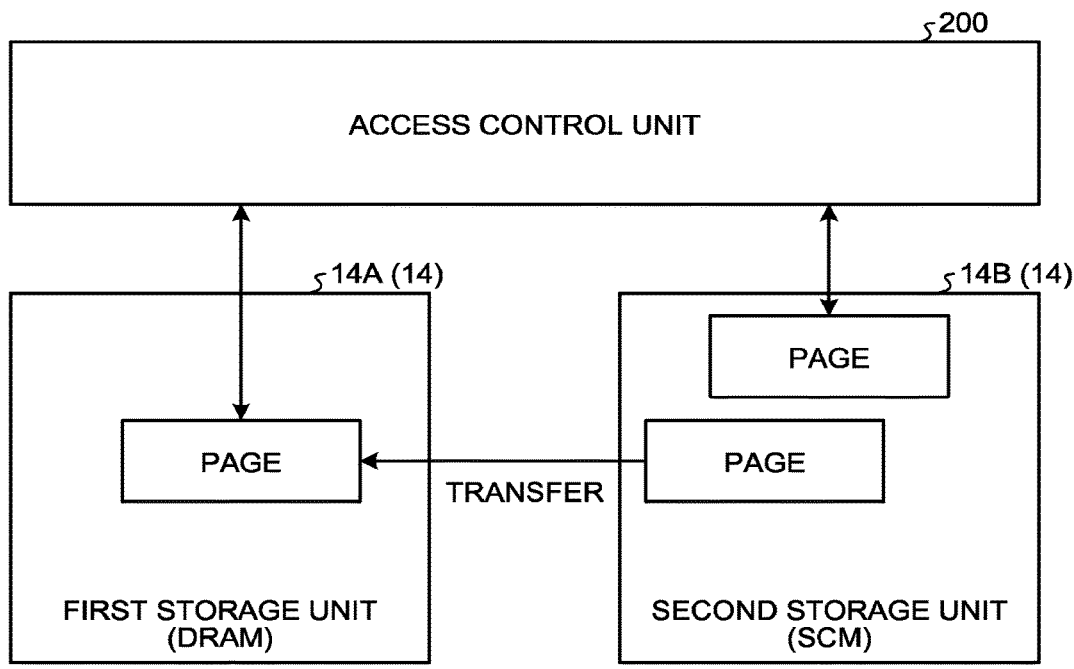

FIG.20

| LOGICAL ADDRESS (PAGE NUMBER) | PHYSICAL ADDRESS | ACCESS MANAGEMENT INFORMATION | | | | | | | | | | | | | | | |
|---|---|---|---|---|---|---|---|---|---|---|---|---|---|---|---|---|---|
| 0f06438b | ADDRESS OF FIRST STORAGE UNIT | 0 | 0 | 1 | 0 | 1 | 0 | 0 | 0 | 0 | 0 | 0 | 0 | 0 | 0 | 1 | 1 |
| 0e8c29f1 | ADDRESS OF FIRST STORAGE UNIT | 1 | 1 | 1 | 1 | 1 | 1 | 1 | 1 | 1 | 0 | 0 | 0 | 0 | 0 | 0 | 0 |
| 0003056f | ADDRESS OF SECOND STORAGE UNIT | 0 | 0 | 1 | 1 | 1 | 1 | 0 | 0 | 0 | 0 | 0 | 0 | 0 | 0 | 0 | 0 | ← Ea (E) |
| 0036dd90 | ADDRESS OF FIRST STORAGE UNIT | 0 | 0 | 0 | 0 | 1 | 1 | 0 | 1 | 1 | 0 | 1 | 0 | 0 | 0 | 0 | 0 |
| 00401f3a | ADDRESS OF SECOND STORAGE UNIT | 1 | 0 | 0 | 1 | 0 | 0 | 1 | 0 | 0 | 1 | 0 | 0 | 1 | 0 | 0 | 0 | ← Eb (E) |
| 0e8c29e7 | ADDRESS OF FIRST STORAGE UNIT | 1 | 1 | 1 | 1 | 1 | 1 | 1 | 1 | 1 | 1 | 1 | 1 | 1 | 1 | 1 | 1 |
| 048f38dc | ADDRESS OF SECOND STORAGE UNIT | 0 | 0 | 0 | 0 | 0 | 0 | 1 | 0 | 0 | 1 | 0 | 0 | 0 | 0 | 0 | 0 | ← Ec (E) |
| 000028fd | ADDRESS OF SECOND STORAGE UNIT | 0 | 0 | 0 | 0 | 0 | 0 | 0 | 0 | 0 | 0 | 1 | 1 | 0 | 0 | 0 | 0 | ← Ed (E) |

| LOGICAL ADDRESS (PAGE NUMBER) | PHYSICAL ADDRESS | ACCESS MANAGEMENT INFORMATION | | | | | | | | | | | | | | | |
|---|---|---|---|---|---|---|---|---|---|---|---|---|---|---|---|---|---|
| 0f06438b | ADDRESS OF SECOND STORAGE UNIT | 1 | 1 | 1 | 0 | 1 | 0 | 0 | 1 | 1 | 1 | 1 | 1 | 1 | 1 | 1 | ← Eh1 (E) |
| 0e8c29f1 | ADDRESS OF FIRST STORAGE UNIT | 1 | 1 | 1 | 1 | 1 | 1 | 1 | 1 | 0 | 0 | 0 | 0 | 0 | 0 | 0 | |
| 0f06438c | ADDRESS OF SECOND STORAGE UNIT | 0 | 0 | 0 | 0 | 0 | 0 | 0 | 0 | 0 | 0 | 0 | 0 | 0 | 0 | 0 | ← Ej (E) |
| 0f06438a | ADDRESS OF SECOND STORAGE UNIT | 1 | 0 | 1 | 0 | 1 | 1 | 0 | 1 | 1 | 1 | 0 | 1 | 1 | 1 | 1 | ← Eh2 (E) |
| 0003056f | ADDRESS OF SECOND STORAGE UNIT | 0 | 0 | 1 | 1 | 1 | 1 | 0 | 0 | 0 | 0 | 0 | 0 | 0 | 0 | 0 | |
| 0036dd90 | ADDRESS OF FIRST STORAGE UNIT | 0 | 0 | 0 | 0 | 1 | 1 | 0 | 1 | 1 | 0 | 1 | 0 | 0 | 0 | 0 | |

| LOGICAL ADDRESS (PAGE NUMBER) | PHYSICAL ADDRESS | ACCESS MANAGEMENT INFORMATION | | | | | | | | | | | | | | | |
|---|---|---|---|---|---|---|---|---|---|---|---|---|---|---|---|---|---|
| 0f06438b | ADDRESS OF SECOND STORAGE UNIT | 1 | 1 | 1 | 0 | 1 | 0 | 0 | 1 | 1 | 1 | 1 | 1 | 1 | 1 | 1 | ← Eh1 (E) |
| 0e8c29f1 | ADDRESS OF FIRST STORAGE UNIT | 1 | 1 | 1 | 1 | 1 | 1 | 1 | 1 | 0 | 0 | 0 | 0 | 0 | 0 | 0 | |
| 0f06438c | ADDRESS OF FIRST STORAGE UNIT | 1 | 0 | 0 | 0 | 0 | 0 | 0 | 0 | 0 | 0 | 0 | 0 | 0 | 0 | 0 | ← Ej' (E') |
| 0f06438a | ADDRESS OF SECOND STORAGE UNIT | 1 | 0 | 1 | 0 | 1 | 1 | 0 | 1 | 1 | 1 | 0 | 1 | 1 | 1 | 1 | ← Eh2 (E) |
| 0003056f | ADDRESS OF SECOND STORAGE UNIT | 0 | 0 | 1 | 1 | 1 | 1 | 0 | 0 | 0 | 0 | 0 | 0 | 0 | 0 | 0 | |
| 0036dd90 | ADDRESS OF FIRST STORAGE UNIT | 0 | 0 | 0 | 0 | 1 | 1 | 0 | 1 | 1 | 0 | 1 | 0 | 0 | 0 | 0 | |

C1    C2 TO C16

MANAGEMENT APPARATUS, INFORMATION PROCESSING APPARATUS, MANAGEMENT METHOD, AND COMPUTER PROGRAM PRODUCT

CROSS-REFERENCE TO RELATED APPLICATIONS

This application is based upon and claims the benefit of priority from Japanese Patent Applications No. 2018-051309 and No. 2018-050512, both filed on Mar. 19, 2018, the entire contents of all of which are incorporated herein by reference.

FIELD

Embodiments described herein relate generally to a management apparatus, an information processing apparatus, a management method, and a computer program product.

BACKGROUND

Various storage class memories (SCMs) such as a magnetoresistive random access memory (MRAM), a resistive RAM (ReRAM), and a phase-change memory (PCM) have been developed. Although an SCM has a lower access speed than a dynamic random access memory (DRAM), the degree of integration of the SCM is high. On the other hand, although the DRAM has a lower degree of integration than SCM, the access speed of the DRAM is high. For this reason, in the case of a system on which a plurality of types of memories are mounted, it is necessary to properly use these memories.

However, in the related art, since it is assumed that only DRAM is used for a main memory, information used for allocating data to a plurality of types of memories is not managed. For example, there is disclosed a method of recording information indicating whether or not access has been made in a page table in unit of a page. However, in the related art, it is not managed which region in the page is accessed, and with respect to information managed in the related art, it is difficult to determine the allocation of data to a plurality of types of memories. In addition, in the related art, it is not managed which region in the page is accessed. In the related art, it is difficult to predict data to be accessed in the future by a processing circuit with a high accuracy.

BRIEF DESCRIPTION OF THE DRAWINGS

FIG. 3 is a schematic diagram illustrating a data configuration of a management table;

FIG. 5 is a schematic diagram illustrating a data configuration of a management table according to a first modified example;

FIG. 9 is an explanatory diagram of access to a storage unit;

FIG. 10 is a schematic diagram illustrating a data configuration of a management table;

FIG. 20 is an explanatory diagram of prediction of a second region;

FIG. 25 is an explanatory diagram of prediction of a second region according to a fifth modified example;

FIG. 26 is an explanatory diagram of prediction of a second region according to a fifth modified example;

DETAILED DESCRIPTION

According to an embodiment, a management apparatus manages access to a plurality of types of storage units by a processing circuit. Each of the plurality of types of storage units includes a plurality of first regions, and each of the plurality of first regions includes a plurality of second regions. The management apparatus includes a circuitry configured to function as a management unit. The management unit manages a management table in which identification information of one or more of the plurality of first regions and access management information defining access information indicating whether or not each second region included in the one or more of the plurality of first regions is accessed by the processing circuit are associated with each other.

Hereinafter, embodiments will be described in detail with reference to the attached drawings.

First Embodiment

Figure 1:
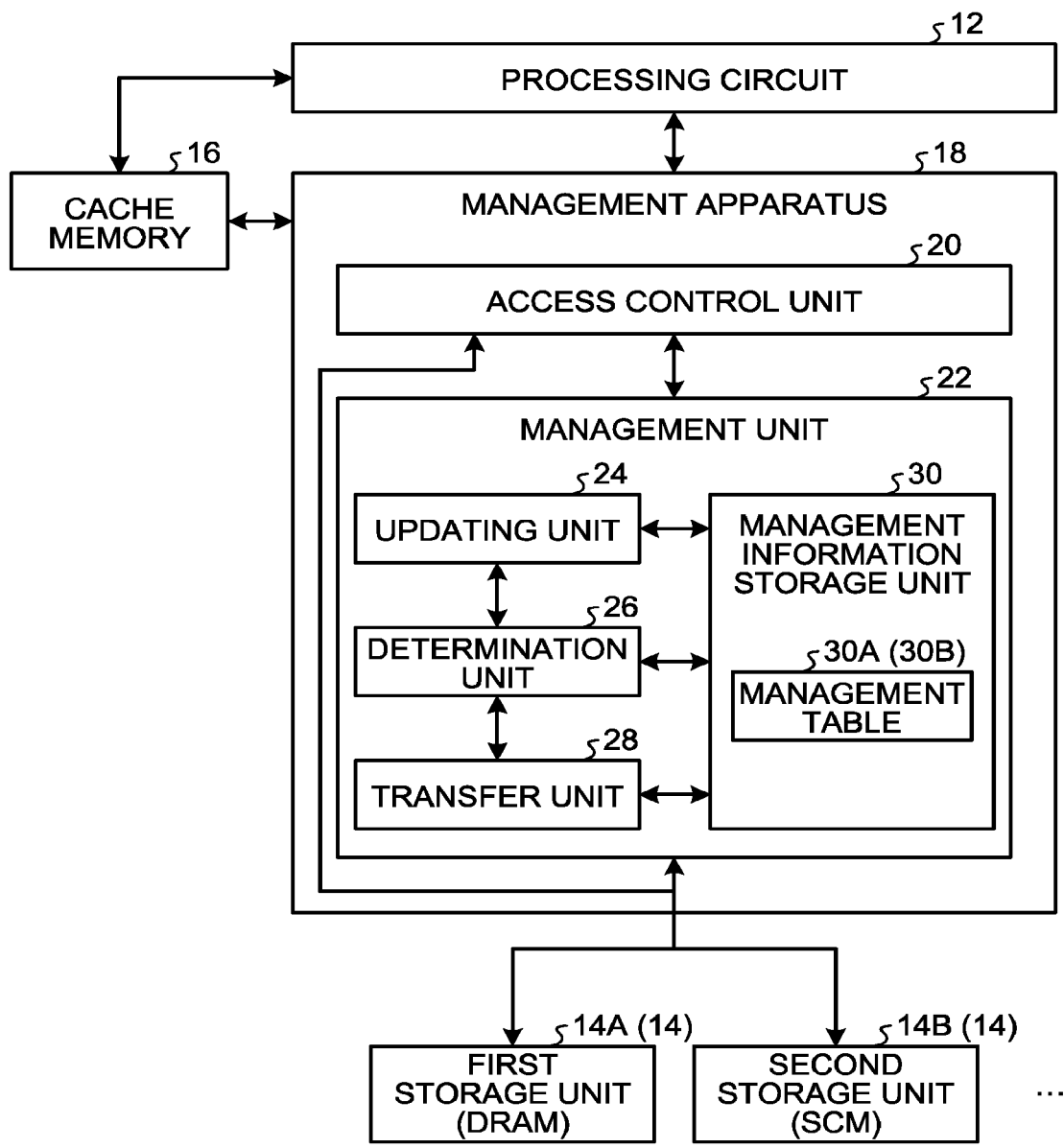
FIG. 1 is a schematic diagram of an information processing apparatus according to a first embodiment.

FIG. 1 is a schematic diagram illustrating an example of a configuration of an information processing apparatus 10 according to a first embodiment. The information processing apparatus 10 includes a processing circuit 12, a management apparatus 18, a cache memory 16, and a storage unit 14.

The processing circuit 12 and the cache memory 16, the processing circuit 12 and the management apparatus 18, the cache memory 16 and the management apparatus 18, and the management apparatus 18 and the storage unit 14 are connected respectively so as to be able to exchange data and signals.

The processing circuit 12 has one or a plurality of processors. The processor is, for example, a central processing unit (CPU). The processor may include one or more CPU cores. The processing circuit 12 reads data from the storage unit 14 and writes data to the storage unit 14 according to the execution of a program.

The processing circuit 12 and the management apparatus 18 described later temporarily store the data stored in the storage unit 14 in the cache memory 16 and use the data for processing.

The storage unit 14 is a main memory used as a work area by the processing circuit 12. The information processing apparatus 10 according to the present embodiment includes a plurality of types of the storage units 14. That is, the information processing apparatus 10 according to the present embodiment uses a plurality of types of the storage units 14 as main memories.

The plurality of types of storage units 14 are different from each other in the access speed by the processing circuit 12. Note that, in the following description, the access speed by the processing circuit 12 may be simply referred to as an access speed. In addition, sometimes, the access speed may also be referred to as access latency. A high access speed denotes that an access latency time is short.

In the present embodiment, the information processing apparatus 10 includes a first storage unit 14A and a second storage unit 14B as a plurality of types of the storage units 14 having different access speeds. In addition, the information processing apparatus 10 may be configured to include three or more types of the storage units 14.

The access speed of the first storage unit 14A is higher than that of the second storage unit 14B. In addition, in the present embodiment, the degree of integration of the first storage unit 14A is lower than that of the second storage unit 14B.

The first storage unit 14A is, for example, a volatile memory. Specifically, the first storage unit 14A is a dynamic random access memory (DRAM). Note that, the first storage unit 14A may be a non-volatile memory such as a magneto-resistive random access memory (MRAM) capable of performing a high speed access like the DRAM.

On the other hand, the access speed of the second storage unit 14B is lower than that of the first storage unit 14A. In addition, in the present embodiment, the capacity of the second storage unit 14B is larger than that of the first storage unit 14A.

The second storage unit 14B is, for example, a non-volatile memory. Specifically, the second storage unit 14B is a large-capacity, high-speed non-volatile memory having a larger capacity than a DRAM.

More specifically, the second storage unit 14B is an MRAM, a phase change memory (PCM), a phase random access memory (PRAM), a phase change random access memory (PCRAM), a resistance change random access memory (ReRAM), a Ferroelectric Random Access Memory (FeRAM), a 3DXPoint, or a Memristor.

In addition, the second storage unit 14B may be a memory that is a so-called storage class memory (SCM). In addition, the second storage unit 14B may be a module in which a plurality of semiconductor devices are provided on one substrate or a casing or the like.

In the present embodiment, a case where the first storage unit 14A is a DRAM and the second storage unit 14B is an SCM will be described as an example. In addition, it is satisfactory that the access speed of the first storage unit 14A is higher than that of the second storage unit 14B, and the combination thereof is not limited to a mode in which the first storage unit 14A is a DRAM and the second storage unit 14B is an SCM. For example, the first storage unit 14A may be an MRAM, and the second storage unit 14B may be a ReRAM.

In addition, in the case of describing the first storage unit 14A and the second storage unit 14B collectively, the first storage unit 14A and the second storage unit 14B are simply referred to as the storage unit 14.

The storage unit 14 includes a plurality of first regions. The first region includes a plurality of second regions. In other words, in the present embodiment, the processing circuit 12 and the management apparatus 18 manage the first storage unit 14A and the second storage unit 14B for each first region and manage the first storage unit 14A and the second storage unit 14B for each second region in the first region.

Figure 2:
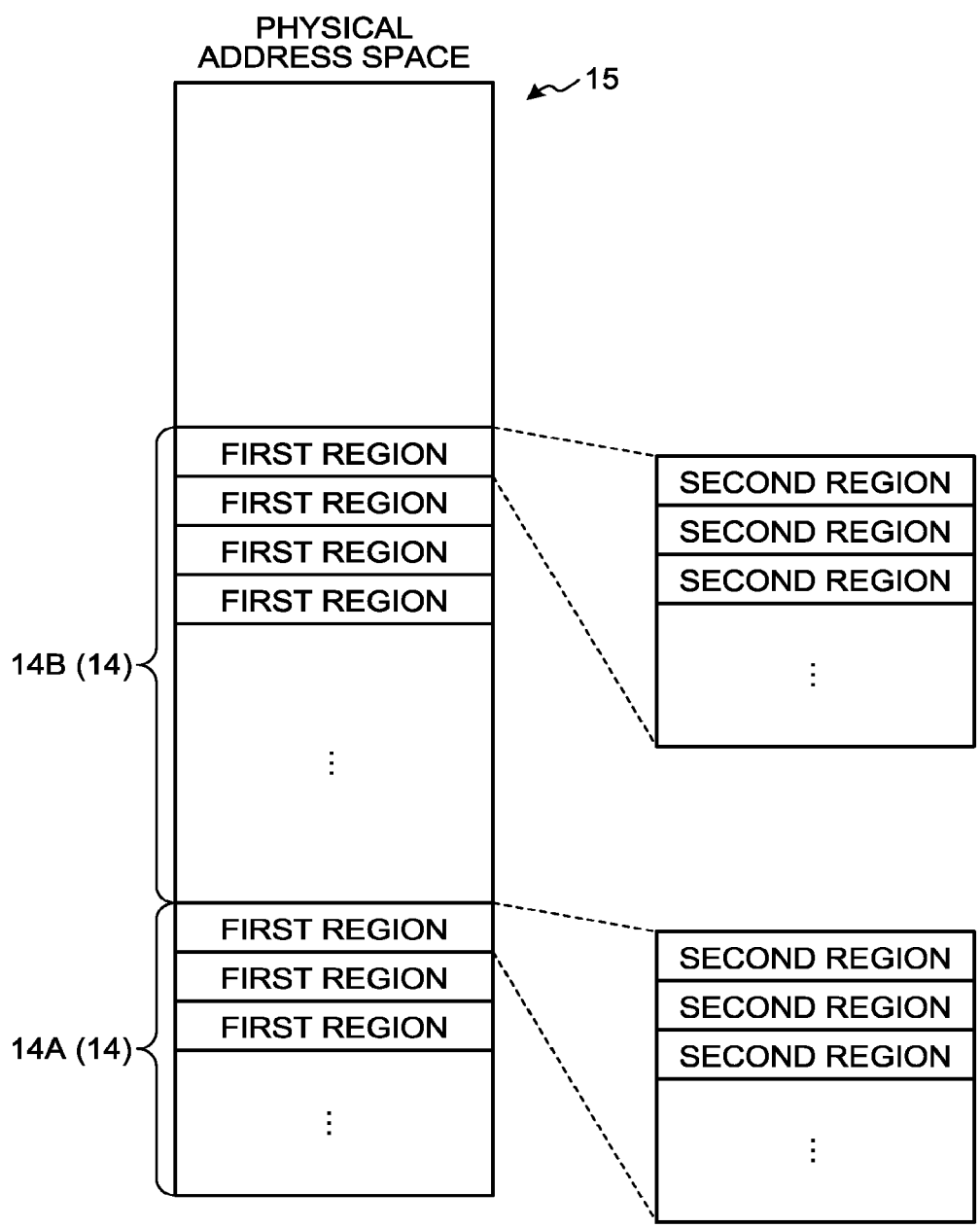
FIG. 2 is a schematic diagram illustrating a physical address space.

FIG. 2 is a schematic diagram illustrating a physical address space viewed from the processing circuit 12.

As illustrated in FIG. 2, each of the first storage unit 14A and the second storage unit 14B includes a plurality of first regions.

The first region is, for example, a unit of data management (for example, a page) by the processing circuit 12. In addition, the first region may be a unit of a predetermined multiple of the unit of data management by the processing circuit 12 or the like. In the present embodiment, a case where the first region corresponds to a page will be described as an example.

The second region is smaller than the first region. For example, the second region is a unit of data rewriting accompanying access to the storage unit 14 by the processing circuit 12. Specifically, the second region is a unit called a cache line. The cache line corresponds to a unit of data rewriting for the cache memory 16. That is, the management apparatus 18 that has received the memory access request from the processing circuit 12 accesses the first storage unit 14A or the second storage unit 14B in unit of a cache line.

The cache line is, for example, 64 bytes. In addition, the second region may be a unit smaller than the cache line (for example, byte unit). In addition, the second region may be a unit of a predetermined multiple of the size of the cache line or the like.

In the present embodiment, the processing circuit 12 and the management apparatus 18 manage the regions in the first storage unit 14A and the second storage unit 14B mapped in the physical address space 15 illustrated in FIG. 2 by dividing the regions by the size of the first region (for example, a page size). Then, the processing circuit 12 and the management apparatus 18 realize virtual storage by converting the logical address to the physical address by using the page table.

In addition, in the present embodiment, the processing circuit 12 and the management apparatus 18 manage the first region by dividing the first region by the size of the second region (for example, a cache line).

In this manner, the information processing apparatus 10 according to the present embodiment is configured so as to be capable of managing each of the plurality of types of storage units 14 for each second region (for example, a cache line), which is a unit smaller than the first region (for example, page unit).

Returning to FIG. 1, the description will be continued. The management apparatus 18 manages access to the plurality of types of storage units 14 (the first storage unit 14A and the second storage unit 14B) by the processing circuit 12. In some cases, the management apparatus 18 may be referred to as a memory management unit (MMU).

The management apparatus 18 includes an access control unit 20 and a management unit 22. The management unit 22 includes an updating unit 24, a determination unit 26, a transfer unit 28, and a management information storage unit 30.

The updating unit 24, the determination unit 26, and the transfer unit 28 are realized by, for example, hardware (logic circuit). In addition, the updating unit 24, the determination unit 26, and the transfer unit 28 may be realized by one or a plurality of processors. For example, at least one of the updating unit 24, the determination unit 26, and the transfer unit 28 may be realized by causing a processor such as a CPU to execute a program, that is, software. In addition, at least one of the updating unit 24, the determination unit 26, and the transfer unit 28 may be realized by hardware such as a dedicated integrated circuit (IC). In addition, the updating unit 24, the determination unit 26, and the transfer unit 28 may be realized by using software and hardware in combination. In the case of using a plurality of processors, each processor may realize one of the updating unit 24, the determination unit 26, and the transfer unit 28 or may realize two or more of the units.

The access control unit 20 processes a memory access request received from the processing circuit 12. The memory access request is an access request to the storage unit 14 by the processing circuit 12. The memory access request indicates writing of data to the storage unit 14 or reading of data from the storage unit 14. The memory access request includes address information of the first region and address information of the second region of the storage unit 14 to be accessed. The address information is represented by a logical address.

In a case where the data to be accessed, which is indicated in the memory access request received from the processing circuit 12, is not stored in the cache memory 16, the access control unit 20 accesses the storage unit 14. In this case, the access control unit 20 accesses the second region within the first region in the storage unit 14 to be accessed, which is indicated in the memory access request received from the processing circuit 12. Then, the management apparatus 18 performs processing (writing and reading) indicated in the memory access request with respect to the second region that has been accessed.

Specifically, in some cases, the memory access request received from the processing circuit 12 may indicate writing to a specific second region. In this case, the access control unit 20 writes the data indicated in the memory access request to the second region within the first region to be accessed in the storage unit 14 to be accessed, which is indicated in the memory access request. In addition, in some cases, the memory access request received from the processing circuit 12 may indicate reading of data from a specific second region. In this case, the access control unit 20 reads data from the second region within the first region to be accessed in the storage unit 14 to be accessed, which is indicated in the memory access request, and stores the data in the cache memory 16 and outputs the data to the processing circuit 12.

Next, the management unit 22 will be described. The management unit 22 manages a management table 30A. FIG. 3 is a schematic diagram illustrating an example of a data configuration of the management table 30A.

The management table 30A is a table in which the identification information of the first region and the access management information are associated with each other. The identification information of the first region is information for identifying the first region of each of the first storage unit 14A and the second storage unit 14B.

In the present embodiment, a case where the first region corresponds to a page as described above will be described. For this reason, in the present embodiment, a case where the identification information of the first region is a page number will be described as an example.

In addition, in the present embodiment, the identification information of the first region registered in the management table 30A is represented by a logical address. That is, in the present embodiment, the identification information of the first region is represented by the page number in the logical address space. For this reason, in the information processing apparatus 10, by specifying the physical address corresponding to the logical address in the page table, which type of the storage units 14 (the first storage unit 14A and the second storage unit 14B) the page number indicated in the management table 30A indicates the page number in can be specified.

The access management information defines the access information for each of the plurality of second regions included in the first region identified by the corresponding page number.

The access information is a flag indicating whether or not the second region is accessed by the processing circuit 12. In the example illustrated in FIG. 3, the access information "0" indicates the second region not-yet accessed by the processing circuit 12. In addition, the access information "1" indicates the second region accessed by the processing circuit 12.

FIG. 3 illustrates an example where cache lines as 16 second regions are allocated to one page (one first region). For example, it is assumed that the size of one page (first region) is 4K bytes. In addition, it is assumed that the size of the cache line which is the second region is 64 bytes. In this case, one first region includes 64 second regions. In addition, the management table 30A is in the state where the access management information defining the access information of each of the 64 second regions is defined for each first region identified by the page number.

Returning to FIG. 1, the description will be continued. The management unit 22 includes an updating unit 24, a determination unit 26, a transfer unit 28, and a management information storage unit 30. The management information storage unit 30 stores the management table 30A.

When receiving the memory access request from the processing circuit 12, the updating unit 24 updates the management table 30A. Specifically, the updating unit 24 updates the access information of the second region to be accessed, which is indicated in the memory access request, corresponding to the page number indicating the first region to be accessed, which is indicated in the memory access request, in the management table 30A to the accessed "1".

Specifically, it is assumed that the data to be accessed, which is indicated in the memory access request received from the processing circuit 12, is not stored in the cache memory 16. In this case, the access control unit 20 accesses the storage unit 14 on the basis of the memory access request. Then, the updating unit 24 receives the memory access request from the access control unit 20.

Then, the updating unit 24 updates the access information of the second region accessed by the processing circuit 12 from the not-yet accessed "0" to the accessed "1" on the basis of the received memory access request.

In addition, only in a case where the memory access request indicates the writing of data to the storage unit 14, the updating unit 24 may update the access information of the second region accessed by the processing circuit 12 from the not-yet accessed "0" to the accessed "1". In addition, only in a case where the memory access request indicates the reading of data from the storage unit 14, the updating unit 24 may update the access information of the second region accessed by the processing circuit 12 from the not-yet accessed "0" to the accessed "1". In addition, in a case where the memory access request indicates the writing of data to the storage unit 14 or the reading of data from the storage unit 14, the updating unit 24 may update the access information of the second region accessed by the processing circuit 12 from the not-yet accessed "0" to the accessed "1".

In this manner, the updating unit 24 updates the access information of the management table 30A every time accessing such as reading of data from the storage unit 14 or writing of data is executed by the processing circuit 12.

For this reason, an access pattern indicating what type of memory access request the processing circuit 12 has issued is registered in the management table 30A.

In addition, in some cases, the page number indicated by the address information of the first region indicated in the memory access request may not exist in the management table 30A. That is, in some cases, the entry in the first region to be accessed, which is indicated in the memory access request, may not exist in the management table 30A.

In this case, the updating unit 24 needs to generate a new entry (a pair of the page number and the access management information) and register the entry in the management table 30A. Herein, the number of entries registered in the management table 30A has an upper limit. For this reason, in a case where there is no empty entry in the management table 30A, the updating unit 24 may release any entry registered in the management table 30A and generate a new entry.

A well-known method may be used as a method for specifying the entry to be released. For example, it preferable that the updating unit 24 specifies the entry to be released by using an algorithm such as least recently used (LRU). By using this method, the updating unit 24 can specify an entry that is not used most, an entry that is not used for a long time, or an entry with a low reference frequency as an entry to be released.

Then, the updating unit 24 registers the page number of the first region indicated in the received memory access request in the newly generated entry (hereinafter, sometimes, referred to as a new entry) and registers the not-yet accessed "0" as the access information of all the second regions of the corresponding access management information. Then, the updating unit 24 may update the access information of the second region to be accessed, which is indicated in the memory access request, in the newly generated new entry in the management table 30A to the accessed "1".

The determination unit 26 determines the transfer destination of the data in the first region identified by the page number in the management table 30A on the basis of the access management information in the management table 30A. Note that, in the present embodiment, "transfer" denotes copying.

That is, by using the access management information corresponding to each of the page numbers in the management table 30A, the determination unit 26 determines the optimum management method for the data in the first region identified by the corresponding page number.

For example, the determination unit 26 determines the transfer destination of each piece of the data in the first region on the basis of the access management information at predetermined time intervals. In addition, in a case where the updating unit 24 releases the entry of the management table 30A, the determination unit 26 may determine the transfer destination of the data in the first region identified by the page number of the entry to be released on the basis of the access management information in the entry. In addition, the determination unit 26 may determine the transfer destination of the data at both timings, that is, at predetermined time intervals and at the timing of releasing the entry of the management table 30A.

In the present embodiment, the determination unit 26 determines, as the transfer destination of the data in the first region identified by the page number corresponding to the access management information in which the number of pieces of access information indicating the accessed "1" in the management table 30A is the first threshold value or more, another type of the storage unit 14 whose access speed by the processing circuit 12 is higher than that of the storage unit 14 in which the data is currently stored. In addition, in some cases, the storage unit 14 in which the data is currently stored may be the storage unit having the highest access speed. In this case, the determination unit 26 may determine the current storage unit 14 in which the data is stored as the transfer destination of the data. Specifically, in the present embodiment, the determination unit 26 determines the first storage unit 14A as the transfer destination of the data in the first region identified by the page number corresponding to the access management information in which the number of pieces of access information indicating the accessed "1" in the management table 30A is the first threshold value or more.

The first threshold value may be determined in advance. For example, the first threshold value is preferably ½ or more of the number of second regions included in one page (first region) and is preferably ⅔ or more.

It is estimated that the locality of the memory access by the processing circuit 12 is high in the first region in which the number of pieces of access information indicating the accessed "1" is equal to or more than a first threshold value. For this reason, with respect to the data in such the first region, the determination unit 26 determines, as the transfer destination, another storage unit 14 whose access speed by the processing circuit 12 is higher than that of the storage unit 14 in which the data is currently stored.

For example, it is assumed that data in the first region in which the number of pieces of access information indicating the accessed "1" is the first threshold value or more is stored in the second storage unit 14B. In this case, the determination unit 26 determines, as the transfer destination of the data, the first storage unit 14A whose access speed is higher than that of the second storage unit 14B. In the case of transferring the data to the first storage unit 14A, the processing circuit 12 can access the data by accessing the first storage unit 14A whose access speed is higher than that of the second storage unit 14B.

On the other hand, the determination unit 26 determines, as the transfer destination of the data in the first region identified by the page number corresponding to the access management information in which the number of pieces of access information indicating the accessed "1" in the management table 30A is less than the second threshold value, the storage unit 14 in which the data is currently stored or another type of the storage unit 14 whose access speed by the processing circuit 12 is lower than that of the storage unit 14 in which the data is currently stored. In addition, in some cases, the storage unit 14 in which the data is currently stored is the storage unit having the lowest access speed. In this case, the determination unit 26 may determine the current storage unit 14 in which data is stored as the transfer destination of the data. Specifically, in the present embodiment, the determination unit 26 determines the second storage unit 14B as the transfer destination of the data in the first region identified by the page number corresponding to the access management information in which the number of pieces of access information indicating the accessed "1" in the management table 30A is less than the second threshold value.

The second threshold value is equal to or less than the first threshold value. The second threshold value may be determined in advance. For example, the second threshold value is preferably ½ or less of the number of second regions included in one page (first region) and is preferably ⅓ or less.

It is estimated that the locality of the memory access by the processing circuit 12 is low in the first region in which the number of pieces of access information indicating the accessed "1" is less than the second threshold value. For this reason, the determination unit 26 determines, as the transfer destination of the data in such the first region, the storage unit 14 in which the data is currently stored or another storage unit 14 whose access speed by the processing circuit 12 is lower than that of the storage unit 14 in which the data is currently stored.

For example, it is assumed that data in the first region in which the number of pieces of access information indicating the accessed "1" is less than the second threshold value is stored in the first storage unit 14A. In this case, the determination unit 26 determines, as the transfer destination of the data, the second storage unit 14B whose access speed is lower than that of the first storage unit 14A. In a case where the data is transferred to the second storage unit 14B, the processing circuit 12 can access the data by accessing the second storage unit 14B whose access speed is lower than that of the first storage unit 14A.

Note that, the method of determining the transfer destination of the data by the determination unit 26 is not limited to the above.

For example, the determination unit 26 may determine, as the transfer destination of the data in the first region identified by the page number corresponding to the access management information in which the consecutive number of pieces of access information indicating the accessed "1" is the third threshold value or more in the management table 30A, another type of the storage unit 14 whose access speed is higher than that of the storage unit 14 in which the data is currently stored. In addition, as described above, in some cases, the storage unit 14 in which the data is currently stored may be the storage unit having the highest access speed. In this case, the determination unit 26 may determine the current storage unit 14 in which the data is stored as the transfer destination of the data. Specifically, in the present embodiment, the determination unit 26 determines the first storage unit 14A as the transfer destination of the data in the first region identified by the page number corresponding to the access management information in which the consecutive number of pieces of access information indicating the accessed "1" in the management table 30A is the third threshold value or more.

The phrase, "the consecutive number of pieces of access information indicating the accessed "1" is the third threshold value or more" denotes the state where the second regions in which the access information indicating the accessed "1" is defined, and whose number is the third threshold value or more, are arranged to be adjacent and consecutive in order of the addresses in the first region.

The third threshold value may be determined in advance. It is preferable that the third threshold value is, for example, a value equal to or more than ¼ of the number of second regions included in one page (first region).

On the other hand, the determination unit 26 may determine, as the transfer destination of the data in the first region identified by the page number corresponding to the access management information in which the consecutive number of pieces of access information indicating the accessed "1" is less than the fourth threshold value in the management table 30A, the storage unit 14 in which the data is currently stored or another type of the storage unit 14 whose access speed is lower than that of the storage unit 14 in which the data is currently stored. In addition, as described above, in some cases, the storage unit 14 in which the data is currently stored may be the storage unit having the lowest access speed. In this case, the determination unit 26 may determine the current storage unit 14 in which the data is stored as the transfer destination of the data. Specifically, in the present embodiment, the determination unit 26 determines the second storage unit 14B as the transfer destination of the data in the first region identified by the page number corresponding to the access management information in which the consecutive number of pieces of access information indicating the accessed "1" in the management table 30A is less than the fourth threshold value.

The fourth threshold value is a value equal to or less than the third threshold value. The fourth threshold value may be determined in advance. It is preferable that the fourth threshold value is, for example, a value equal to or less than ⅛ of the number of second regions included in one page (first region).

Next, the transfer unit 28 will be described. The transfer unit 28 transfers the data in the first region which is determined as the transfer destination by the determination unit 26 to the storage unit 14 determined by the determination unit 26.

The timing at which the transfer unit 28 transfers data is not limited. For example, every time a transfer destination is determined by the determination unit 26, the transfer unit 28 may transfer the data in the first region of the storage unit 14 which is determined as the transfer destination to the determined storage unit 14.

In addition, the transfer unit 28 may transfer the data at a predetermined timing after a predetermined time elapses from the determination of the storage unit 14 of the transfer destination by the determination unit 26. For example, the transfer unit 28 may transfer the data during a period when access to the storage unit 14 by the processing circuit 12 is small.

In this manner, the transfer unit 28 transfers the data in the first region of the storage unit 14 which is determined as the transfer destination by the determination unit 26 to the storage unit 14 determined by the determination unit 26, so that the following effects can be obtained. That is, the transfer unit 28 can automatically transfer (that is, allocate)

the data to the storage unit 14 of the transfer destination determined by the determination unit 26 without user's operation.

Then, the transfer unit 28 updates the physical address corresponding to the transferred logical address of the first region in the page table to the physical address indicating the storage destination of the storage unit 14 of the transfer destination. For this reason, the processing circuit 12 can directly access the storage unit 14 of the transfer destination. In addition, the updating of the page table may be performed by the determination unit 26.

Figure 4:
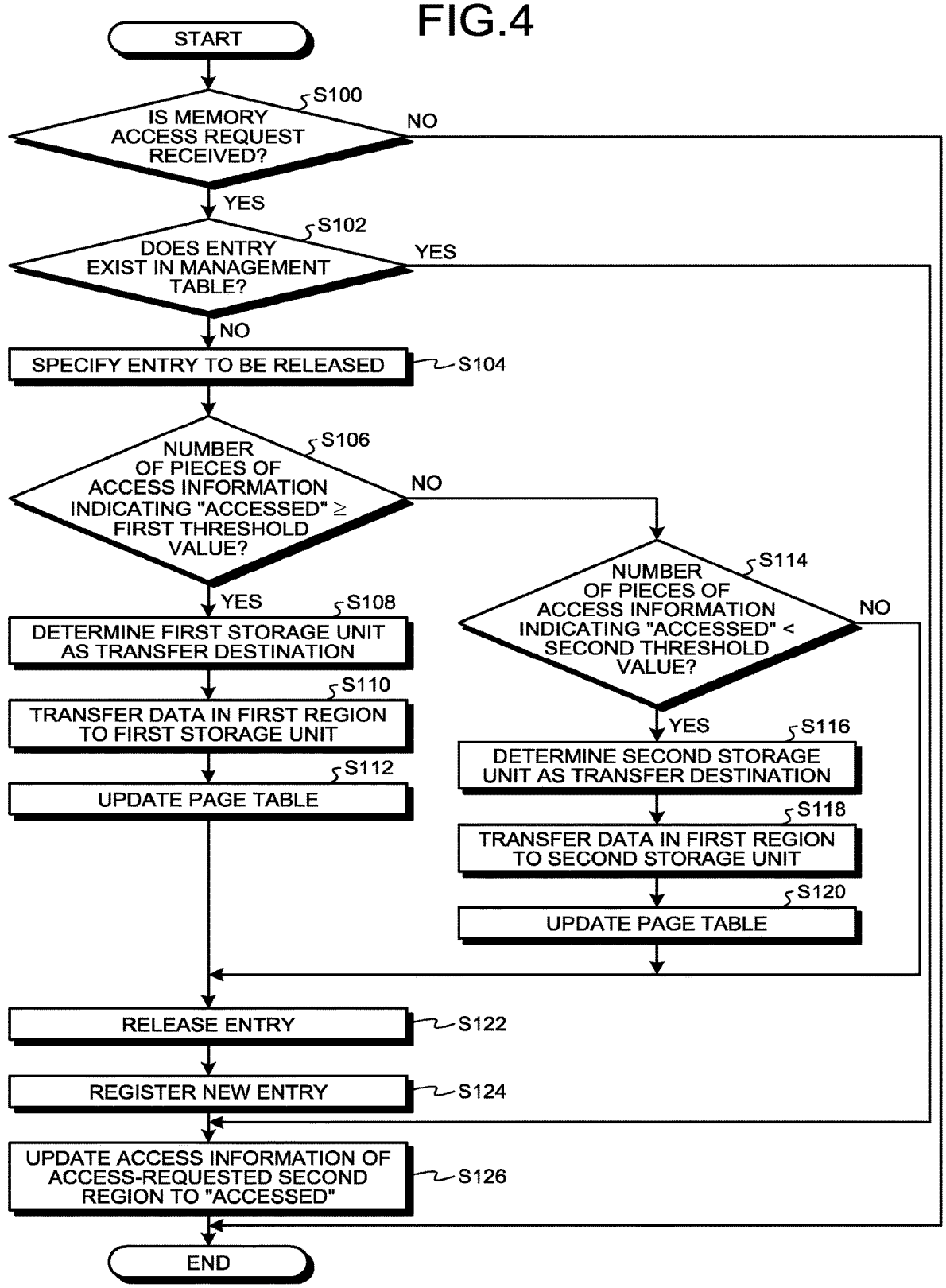
FIG. 4 is a flowchart of an information processing procedure.

Next, an example of an information processing procedure executed by the information processing apparatus 10 according to the present embodiment will be described. FIG. 4 is a flowchart illustrating the example of the information processing procedure executed by the information processing apparatus 10.

First, the updating unit 24 determines whether or not a memory access request has been received from the processing circuit 12 through the access control unit 20 (Step S100). When a negative determination is made in Step S100 (Step S100: No), this routine is ended. If an affirmative determination is made in Step S100 (Step S100: Yes), the process proceeds to Step S102.

In Step S102, the updating unit 24 determines whether or not the entry including the page number indicated by the address information of the first region indicated in the memory access request received in Step S100 is in the management table 30A (Step S102). The updating unit 24 performs the determination in Step S102 by determining whether or not the page number of the first region to be accessed included in the memory access request received in Step S100 is registered in the management table 30A.

If an affirmative determination is made in Step S102 (Step S102: Yes), the process proceeds to Step S126 to be described later. If a negative determination is made in Step S102 (Step S102: No), the process proceeds to Step S104.

In Step S104, the updating unit 24 specifies the entry to be released in the management table 30A (Step S104).

Next, the determination unit 26 determines whether or not the number of pieces of access information indicating the accessed "1" is the first threshold value or more with respect to the access management information in the entry specified in Step S104 (Step S106).

In a case where the number of pieces of access information indicating the accessed "1" is the first threshold value or more (Step S106: Yes), the process proceeds to Step S108. In Step S108, the determination unit 26 determines, as the transfer destination of the data in the first region identified by the page number included in the entry specified in Step S104, another type of the storage unit 14 (for example, the first storage unit 14A) whose access speed by the processing circuit 12 is higher than that of the storage unit 14 (for example, the second storage unit 14B) in which the data is currently stored (Step S108).

Next, the transfer unit 28 transfers the data in the first region identified by the page number included in the entry specified in Step S104 to the storage unit 14 (for example, the first storage unit 14A) determined in Step S108 (Step S110).

Next, the transfer unit 28 updates the physical address corresponding to the logical address of the first region transferred in Step S110 in the page table to the physical address indicating the storage destination of the storage unit 14 (for example, the first storage unit 14A) of the transfer destination transferred in Step S110 (Step S112). For this reason, in the case of accessing the data, the processing circuit 12 can access the data by accessing the first storage unit 14A. Then, the process proceeds to Step S122 described later.

In addition, the updating of the page table in Step S112 may be performed after the processing of Step S108 by the determination unit 26. In addition, in Step S112, the transfer unit 28 only needs to execute a process that enables the processing circuit 12 to directly access the first storage unit 14A in the case of accessing the data, and the process is not limited to the process of updating the page table.

On the other hand, if it is determined by the determination of Step S106 that the number of pieces of access information indicating the accessed "1" is less than the first threshold value (Step S106: No), the process proceeds to Step S114. Then, the determination unit 26 determines whether or not the number of pieces of access information indicating the accessed "1" is less than the second threshold value with respect to the access management information in the entry specified in Step S104 (Step S114). In a case where the number of pieces of access information is the second threshold value or more (Step S114: No), the process proceeds to Step S122 described later. In a case where the number of pieces of access information is less than the second threshold value (Step S114: Yes), the process proceeds to Step S116.

In Step S116, the determination unit 26 determines the storage unit 14 (for example, the second storage unit 14B) in which the data is currently stored as the transfer destination of the data in the first region identified by the page number included in the entry specified in Step S104 (Step S116). In addition, as described above, in a case where the data in the first region identified by the page number is stored in the first storage unit 14A, the determination unit 26 may determine the second storage unit 14B as the transfer destination.

Then, the transfer unit 28 transfers the data in the first region identified by the page number included in the entry specified in Step S104 to the storage unit 14 (for example, the second storage unit 14B) determined in Step S116 (Step S118).

Next, the transfer unit 28 updates the physical address corresponding to the logical address of the first region transferred in Step S118 in the page table to the physical address indicating the storage destination of the storage unit 14 (for example, the second storage unit 14B) of the transfer destination transferred in Step S118 (Step S120).

For this reason, in the case of accessing the data, the processing circuit 12 can access the data by accessing the second storage unit 14B. Then, the process proceeds to Step S122. Note that, in a case where the data has already been stored in the second storage unit 14B before the processing in Step S118, the processing in Steps S118 and S120 may be omitted.

In addition, the updating of the page table in Step S120 may be executed by the determination unit 26 after the processing in Step S116. In addition, in Step S120, the transfer unit 28 may execute the process that enables the processing circuit 12 to directly access the second storage unit 14B in a case where the processing circuit 12 accesses the data, and the process is not limited to the process of updating the page table.

In Step S122, the updating unit 24 releases the entry specified in Step S104 in the management table 30A (Step S122). Then, the updating unit 24 registers a new entry in the management table 30A (Step S124). In Step S124, the updating unit 24 registers a new entry in which the page number of the first region indicated in the memory access request received in Step S100 and the access management information in which the access information of all the second regions is set to not-yet accessed "0" are associated with each other.

Next, the updating unit 24 updates the access information of the second region to be accessed, which is indicated in the memory access request, corresponding to the page number indicating the first region to be accessed, which is indicated in the memory access request received in Step S100, in the management table 30A to the accessed "1" (Step S126). Then, this routine is ended.

As described above, the management apparatus 18 according to the present embodiment manages access to a plurality of types of the storage units 14 by the processing circuit 12. The storage unit 14 includes a plurality of the first regions, and the first region includes a plurality of the second regions. The management apparatus 18 includes a management unit 22. The management unit 22 manages the management table 30A. The management table 30A is a table in which the identification information (page number) of the first region and the access management information defining the access information indicating whether or not the second region is accessed by the processing circuit 12 for each of the plurality of second regions included in the first region are associated with each other.

As described above, the management apparatus 18 according to the present embodiment manages the access information indicating whether or not each of the plurality of types of storage units 14 for each second region, which is a unit smaller than the first region, has been accessed by the processing circuit 12. For this reason, it is possible to easily manage which second region within the first region such as a page has been accessed by the processing circuit 12 with respect to each of the plurality of types of storage units 14.

Therefore, the management apparatus 18 according to the present embodiment can provide information used for data allocation to a plurality of types of memories (storage units 14).

Herein, in a case where a plurality of types of the storage units 14 are used as a main memory, in some cases, it is required to allocate and use the data for each of the plurality of types of storage units 14 according to a pattern of access by the processing circuit 12.

For example, the capacity of an SCM is larger than that of a DRAM, but the access speed is slower. For this reason, if data is allocated to and stored in a plurality of types of the storage units 14 in accordance with the characteristics of access by the processing circuit 12, the processing circuit 12 can perform data processing efficiently.

For example, data with a low locality of access by the processing circuit 12 and a large size is arranged in the SCM, and the processing circuit 12 directly accesses the SCM. Then, the processing circuit 12 can perform data processing efficiently. In addition, data with a high locality of access is allocated to a DRAM with an access speed higher than that of the SCM, and the processing circuit 12 accesses the data on the DRAM. Then, the processing circuit 12 can perform data processing efficiently.

However, in the related art, it is a difficult task to determine how to efficiently distribute and store the data in plurality of types of storage units 14, and complicated programming is required.

In addition, in the method of recording the information indicating whether or not the information is accessed in the page table in unit of a page, the information is insufficient as the information used for allocating the data to a plurality of types of memories, and it is difficult to provide information that can detect the pattern of access by the processing circuit 12 in detail.

On the other hand, in the management apparatus 18 according to the present embodiment, with respect to each of the plurality of types of storage units 14, for each second region whose size is smaller than that the first region (for example, the size of the cache line is 64 bytes), the access management information indicating a pattern of access by the processing circuit 12 is managed.

For this reason, the management apparatus 18 according to the present embodiment can provide information used for data allocation to a plurality of types of memories.

Modified Example 1

Note that, in the above-described embodiment, a case where the management table 30A is obtained by associating the identification information (page number) of the first region represented by the logical address with the access management information has been described.

However, the management table 30A may be obtained by further associating a physical address.

FIG. 5 is a schematic diagram illustrating an example of a data configuration of a management table 30B according to a first modified example. The management table 30B may have a configuration in which a logical address as identification information of the first region, a physical address of the first region in the storage unit 14, and access management information are associated with each other. In this case, the management information storage unit 30 may store the management table 30B instead of the management table 30A (see FIG. 1).

By using the management table 30B having the data configuration illustrated in FIG. 5, the translation lookaside buffer (TLB) functioning as a cache of the page table and the management table 30A can be integrated and managed. That is, by using the logical address as the search key, it is possible to search both the physical address possessed by the TLB and the access management information. For this reason, by using the management table 30B, it is possible to share hardware for associative storage, which searches entries by using the page number represented by the logical address as a search key.

Modified Example 2

Figure 6:
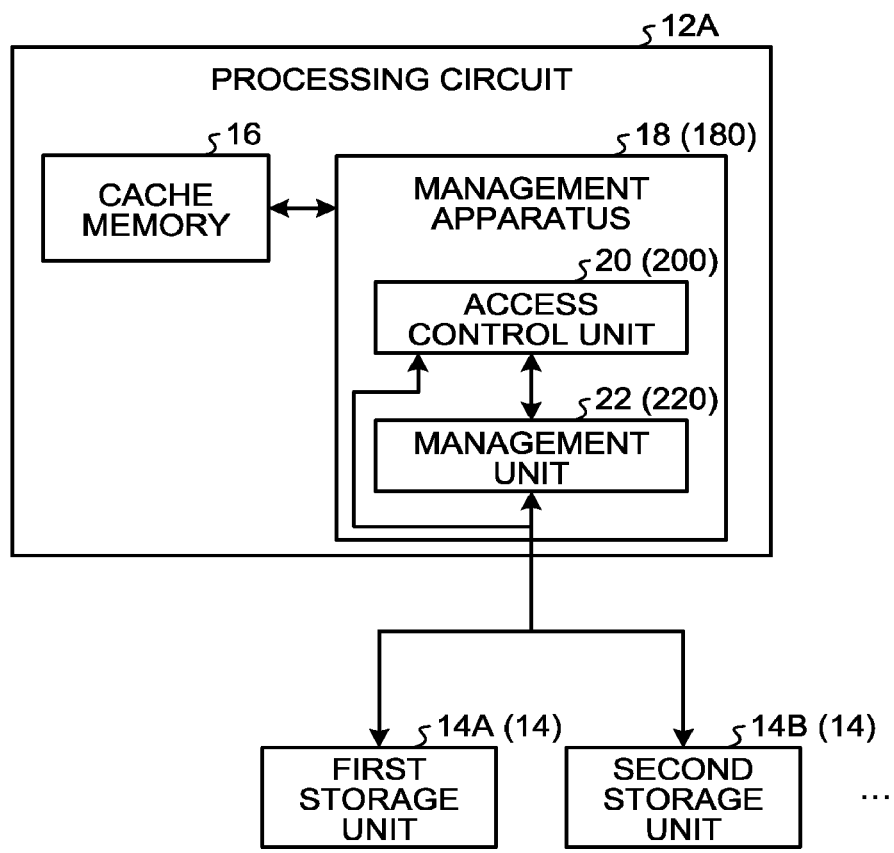
FIG. 6 is a schematic diagram of an information processing apparatus according to a second modified example and a sixth modified example.

FIG. 6 is a schematic diagram illustrating an example of an information processing apparatus 10A according to a second modified example. As illustrated in FIG. 6, a processing circuit 12A of the information processing apparatus 10A may be configured to include a cache memory 16 and a management apparatus 18. The processing circuit 12A is the same as the processing circuit 12 according to the above-described embodiment except that the cache memory 16 and the management apparatus 18 are provided inside.

Modified Example 3

Figure 7:
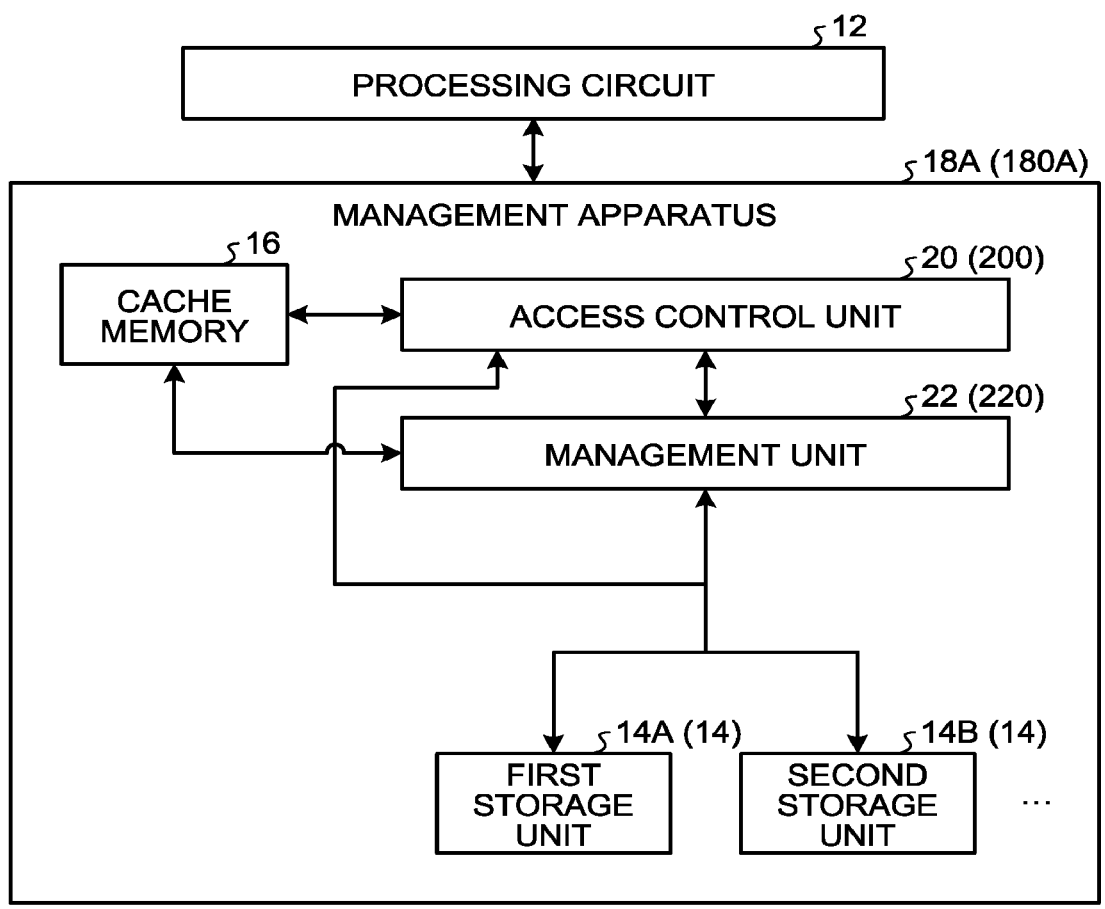
FIG. 7 is a schematic diagram of an information processing apparatus according to a third modified example and a seventh modified example.

FIG. 7 is a schematic diagram illustrating an example of the information processing apparatus 10B according to a third modified example. As illustrated in FIG. 7, the management apparatus 18A may be configured to include a cache memory 16, an access control unit 20, a management unit 22, and a storage unit 14.

Second Embodiment

Hereinafter, the present embodiment will be described in detail with reference to the attached drawings.

Figure 8:
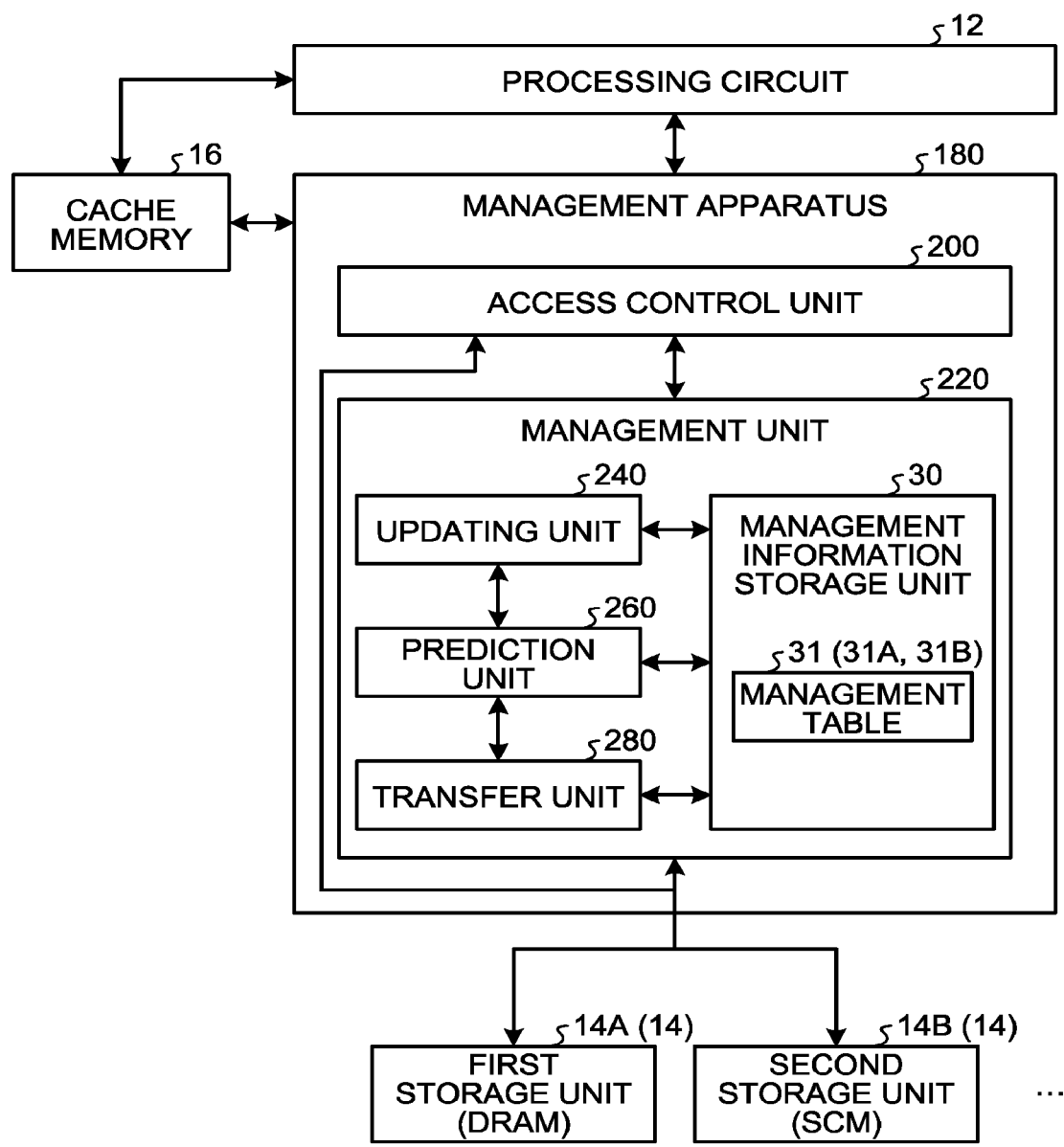
FIG. 8 is a schematic diagram of an information processing apparatus according to a second embodiment.

FIG. 8 is a schematic diagram illustrating an example of a configuration of an information processing apparatus 100 according to a second embodiment. The information processing apparatus 100 includes a processing circuit 12, a storage unit 14, a cache memory 16, and a management apparatus 180.

The processing circuit 12 and the cache memory 16, the cache memory 16 and the management apparatus 180, the processing circuit 12 and the management apparatus 180, and the management apparatus 180 and the storage unit 14 are connected respectively so as to be able to exchange data and signals.

The processing circuit 12 has one or a plurality of processors. The processor is, for example, a central processing unit (CPU). The processor may include one or more CPU cores. The processing circuit 12 reads data from the storage unit 14 and writes data to the storage unit 14 according to the execution of a program.

The processing circuit 12 and the management apparatus 180 temporarily store the data stored in the storage unit 14 in the cache memory 16 and use the data for processing.

The storage unit 14 is a main memory used as a work area by the processing circuit 12. The information processing apparatus 100 according to the present embodiment includes a plurality of types of storage units 14. That is, the information processing apparatus 100 according to the present embodiment uses a plurality of types of the storage units 14 as main memories.

The plurality of types of storage units 14 are different from each other in the access speed by the processing circuit 12. Note that, in the following description, the access speed by the processing circuit 12 may be simply referred to as an access speed.

In the present embodiment, the information processing apparatus 100 includes a first storage unit 14A and a second storage unit 14B as a plurality of types of the storage units 14 having different access speeds. In addition, the information processing apparatus 100 may be configured to include three or more types of the storage units 14.

The first storage unit 14A is, for example, a volatile memory. Specifically, the first storage unit 14A is a dynamic random access memory (DRAM). In addition, the first storage unit 14A may be a non-volatile memory such as a magnetoresistive random access memory (MRAM) capable of performing a high speed access.

The access speed of the second storage unit 14B is lower than that of the first storage unit 14A. In addition, the capacity of the second storage unit 14B is equal to or larger than that of the first storage unit 14A.

The second storage unit 14B is, for example, a non-volatile memory. Specifically, the second storage unit 14B is a large-capacity, high-speed non-volatile memory having a higher degree of integration and a larger capacity than a DRAM.

More specifically, the second storage unit 14B is a memory called a storage class memory (SCM). For example, the second storage unit 14B includes an MRAM, a phase change memory (PCM), a phase random access memory (PRAM), a phase change random access memory (PCRAM), a resistance change random access memory (ReRAM), a ferroelectric random access memory (FeRAM), a 3DXPoint or a Memristor.

In the present embodiment, a case where the first storage unit 14A is a DRAM and the second storage unit 14B is an SCM will be described as an example. In addition, it is satisfactory that the access speed of the first storage unit 14A is higher than that of the second storage unit 14B, and the combination thereof is not limited to a mode in which the first storage unit 14A is a DRAM and the second storage unit 14B is an SCM. For example, the first storage unit 14A may be an MRAM, and the second storage unit 14B may be a ReRAM.

FIG. 9 is an explanatory diagram of a method of accessing the first storage unit 14A and the second storage unit 14B. If SCM is to be installed in addition to the conventional DRAM as the main memory of the computer system, it is necessary to properly use both. In other words, SCM has larger capacity than DRAM, but access speed is slow. For this reason, efficient data processing becomes possible by distributing the memory in which data is allocated to DRAM and SCM well in accordance with the characteristics of data to be processed. That is, it is preferable that data with low access locality and large size is placed in the SCM, and the processor directly accesses the SCM in unit of a cache line. In addition, it is preferable that data with high access locality is transferred from the SCM to the DRAM in unit of a page, and the processor accesses the data on the DRAM in unit of a cache line.

Returning to FIG. 8, the description will be continued. In addition, in the case of describing the first storage unit 14A and the second storage unit 14B collectively, the first storage unit 14A and the second storage unit 14B are simply referred to as the storage unit 14.

The storage unit 14 includes a plurality of first regions. In the present embodiment, a mode in which the first storage unit 14A and the second storage unit 14B include a plurality of first regions will be described. The first region includes a plurality of second regions. That is, in the present embodiment, the processing circuit 12 and the management apparatus 180 manage the first storage unit 14A and the second storage unit 14B in unit of a first region or in unit of a second region obtained by further finely dividing the first region.

FIG. 2 is a schematic diagram illustrating a physical address space viewed from the processing circuit 12.

As illustrated in FIG. 2, each of the first storage unit 14A and the second storage unit 14B includes a plurality of first regions. The first region, the second region, and the cache line are the same as those in the first embodiment.

In the present embodiment, the processing circuit 12 and the management apparatus 180 manage the regions in the first storage unit 14A and the second storage unit 14B mapped in the physical address space 15 illustrated in FIG. 2 by dividing the regions by the size (for example, a page size) of the first region. Then, the processing circuit 12 and the management apparatus 180 realize virtual storage by converting the logical address to the physical address by using the page table.

In addition, in the present embodiment, the processing circuit 12 and the management apparatus 180 manage each of the second regions by dividing the first region by the size (for example, a cache line) of the second region.

In this manner, the information processing apparatus 100 according to the present embodiment is configured so as to be capable of managing each of the plurality of types of storage units 14 for each second region (for example, a cache line), which is a unit smaller than the first region (for example, page unit).

In addition, the information processing apparatus 100 according to the present embodiment will be described as an example of a case where the first storage unit 14A and the second storage unit 14B are combined and used as a main storage as a plurality of types of storage units used in the invention.

Returning to FIG. 8, the description will be continued. The management apparatus 180 manages access to a plurality of types of storage units 14 by the processing circuit 12. The management apparatus 180 is, for example, a memory management unit (MMU).

The management apparatus 180 includes an access control unit 200 and a management unit 220. The management unit 220 includes an updating unit 240, a prediction unit 260, a transfer unit 280, and a management information storage unit 30.

The access control unit 200 processes a memory access request received from the processing circuit 12. The memory access request is a memory access request to the storage unit 14. The memory access request indicates writing of data to the storage unit 14 or reading of data from the storage unit 14.

In a case where the data to be accessed, which is indicated in the memory access request received from the processing circuit 12, is not stored in the cache memory 16, the access control unit 200 accesses the storage unit 14. In this case, the access control unit 200 accesses the second region within the storage unit 14 to be accessed, which is indicated in the memory access request received from the processing circuit 12. Then, the management apparatus 180 executes processing (writing and reading) indicated in the memory access request with respect to the second region that has been accessed.

Next, the management unit 220 will be described. The management unit 220 manages a management table 31A. The management table 31A is an example of the management table 31. An example of the data configuration of the management table 31A is the same as that of the management table 30A according to the first embodiment (see FIG. 3).

As illustrated in FIG. 3, the management table 31A is a table in which the identification information of the first region and the access management information are associated with each other. That is, in the management table 31A, a plurality of entries E in which the identification information of the first region and the access management information are associated in one-to-one correspondence are registered.

The definition of the identification information of the first region is the same as that of the first embodiment. In addition, similarly to the first embodiment, in the present embodiment, a case where the first region corresponds to a page and the identification information of the first region is a page number will be described as an example.

In addition, similarly to the first embodiment, the identification information of the first region registered in the management table 31A is represented by a logical address. For this reason, in the information processing apparatus 100, by specifying the physical address corresponding to the logical address in the page table, which type of the storage units 14 (the first storage unit 14A and the second storage unit 14B) the page number indicated in the management table 31A indicates the page number in can be specified.

The definitions of access management information and access information are the same as those in the first embodiment.

In addition, instead of the management table 31A, the management table 31B may be used. The management table 31B is an example of the management table 31.

FIG. 10 is a schematic diagram illustrating an example of the data configuration of the management table 31B. The management table 31B is obtained by further associating a physical address with the management table 31A. Specifically, the management table 31B has a configuration in which a logical address as the identification information of the first region, a physical address of the first region in the storage unit 14, and the access management information are associated with one another. In this case, the management information storage unit 30 may store the management table 31B instead of the management table 31A (see FIG. 8).

By using the management table 31B having the data configuration illustrated in FIG. 10, the management table 31A (see FIG. 3) and the translation lookaside buffer (TLB) functioning as a cache of the page table can be integrated and managed. That is, by using the logical address as the search key, the processing circuit 12 can search both the physical address possessed by the TLB and the access management information of each of the second regions. For this reason, by using the management table 31B, it is possible to provide hardware for associative storage, which searches the entries E by using the page number represented by the logical address as a search key. In addition, the entry E in the management table 31B is obtained by associating the logical address, the physical address, and the access management information in one-to-one-to-one correspondence.

Returning to FIG. 8, the description will be continued. The management unit 220 includes an updating unit 240, a prediction unit 260, a transfer unit 280, and a management information storage unit 30.

The management information storage unit 30 stores the management table 31A or the management table 31B. That is, the management information storage unit 30 is an example of the management unit according to the present invention. In addition, in the present embodiment, a case where the management table 31A (see FIG. 3) is used as the management table 31 will be described as an example.

When receiving a memory access request from the processing circuit 12, the updating unit 240 updates the management table 31A. Specifically, the updating unit 240 updates the access information of the second region to be accessed, which is indicated in the memory access request, corresponding to the page number indicating the first region to be accessed, which is indicated in the memory access request, in the management table 31A to the accessed "1". In addition, the initial value of the access information in the management table 31A is not-yet accessed "0" and is updated to the accessed "1" by the updating unit 240.

Specifically, it is assumed that the data to be accessed, which is indicated in the memory access request received from the processing circuit 12, is not stored in the cache memory 16. In this case, the access control unit 200 accesses the storage unit 14 on the basis of the memory access request. Then, the updating unit 240 receives the memory access request from the access control unit 200.

Then, on the basis of the received memory access request, the updating unit 240 updates the access information of the second region accessed by the processing circuit 12 from not-yet accessed "0" to the accessed "1".

In addition, only in a case where the memory access request indicates writing of data to the storage unit 14, the updating unit 240 may update the access information of the second region accessed by the processing circuit 12 from the not-yet accessed "0" to the accessed "1". In addition, only in a case where the memory access request indicates reading of data from the storage unit 14, the updating unit 240 may update the access information of the second region accessed by the processing circuit 12 from the not-yet accessed "0" to the accessed "1". In addition, in a case where the memory access request indicates writing of data to the storage unit 14 or reading of data from the storage unit 14, the updating unit 240 may update the access information of the second region accessed by the processing circuit 12 from the not-yet accessed "0" to the accessed "1".

In this manner, the updating unit 240 updates the access information of the management table 31A every time the accessing such as reading of data from the storage unit 14 or writing of data is executed by the processing circuit 12.

For this reason, the access management information of the management table 31A indicates what kind of pattern of the memory access request the processing circuit 12 has issued to the second region within the first region identified by the page number.

In addition, in some cases, the page number represented by the logical address of the first region indicated in the memory access request may not exist in the management table 31A. That is, in some cases, the entry E of the first region to be accessed, which is indicated in the memory access request, may not exist in the management table 31A.

In this case, the updating unit 240 needs to generate a new entry E and register the new entry in the management table 31A. Herein, the number of entries registered in the management table 31A has an upper limit. For this reason, in a case where there is no empty entry E in the management table 31A, the updating unit 240 may release any entry E registered in the management table 31A and generate a new entry E.

A well-known method may be used for specifying the entry E to be released. For example, it is preferable that the updating unit 240 specifies the entry E to be released by using an algorithm such as least recently used (LRU). By using this method, the updating unit 240 can specify an entry that is not used most, an entry E that is not used for a long time, or an entry E that has a low reference frequency as the entry E to be released.

Then, the updating unit 240 registers the page number of the first region indicated in the received memory access request in the newly generated entry E. Then, the updating unit 240 registers not-yet accessed "0" as the access information of all the second regions in the access management information corresponding to the page number in the entry E. Then, the updating unit 240 may update the access information of the second region to be accessed, which is indicated in the memory access request, in the newly generated entry E to the accessed "1". In addition, in the following description, in some cases, the newly generated entry E may be simply referred to as a new entry E.

The prediction unit 260 predicts the second region to be accessed in the future by the processing circuit 12 on the basis of the access management information of the management table 31A. The second region to be accessed in the future denotes a second region predicted to be accessed by the processing circuit 12 at a timing in the future from the current time (later than the current time).

Then, the prediction unit 260 updates the access information of the second region predicted to be accessed in the future in the management table 31A to the accessed "1".

In addition, the timing of prediction by the prediction unit 260 is not limited.

For example, the prediction unit 260 predicts the second region to be accessed in the future every time the updating unit 240 updates the access information of the second region in the management table 31A to the accessed "1". In this case, for example, the prediction unit 260 predicts any one of the second regions indicating the not-yet accessed "0" in the first region as the second region to be accessed in the future on the basis of the access management information corresponding to the page number of the first region including the second regions in which the access information is updated.

In addition, for example, the prediction unit 260 may predict the second region to be accessed in the future by the processing circuit 12 every predetermined period.

In this case, the prediction unit 260 may predict an one of the second regions indicating the not-yet accessed "0" as the second region to be accessed in the future on the basis of the access information of the second region included in each of the first regions identified by each of the page numbers defined in the management table 31A every predetermined period.

In addition, the prediction unit 260 may predict the second region to be accessed in the future at both timings, that is, every time the access information in the management table 31A is updated to the accessed "1" by the updating unit 240 and every predetermined period.

The prediction by the prediction unit 260 will be specifically described.

For example, the prediction unit 260 predicts the second region to be accessed in the future by the processing circuit 12 according to the pattern indicated by the access information in the management table 31A.

The pattern indicated by the access information represents an access pattern to the storage unit 14 by the processing circuit 12. Specifically, the pattern is represented by a positional relationship of one or a plurality of second regions in which access information indicating the accessed "1" is defined in the storage unit 14. For example, the pattern indicated by the access information represents the regularity of the access information indicating the accessed "1". Specifically, the pattern indicated by the access information is represented by at least one of the consecutiveness of arrangement and the interval of arrangement of the access information indicating the accessed "1". However, the pattern is not limited thereto.

For example, in a case where the prediction is performed every time the updating unit 240 updates the access information of the second region in the management table 31A, the prediction unit 260 performs the prediction by the following method by using the pattern indicated by the access information.

For example, the prediction unit 260 predicts the second region to be accessed in the future by the processing circuit 12 according to the pattern indicated by a plurality of pieces of the access information including the access information which has been recently updated by the updating unit 240 in the access management information of the management table 31A.

Figure 11:
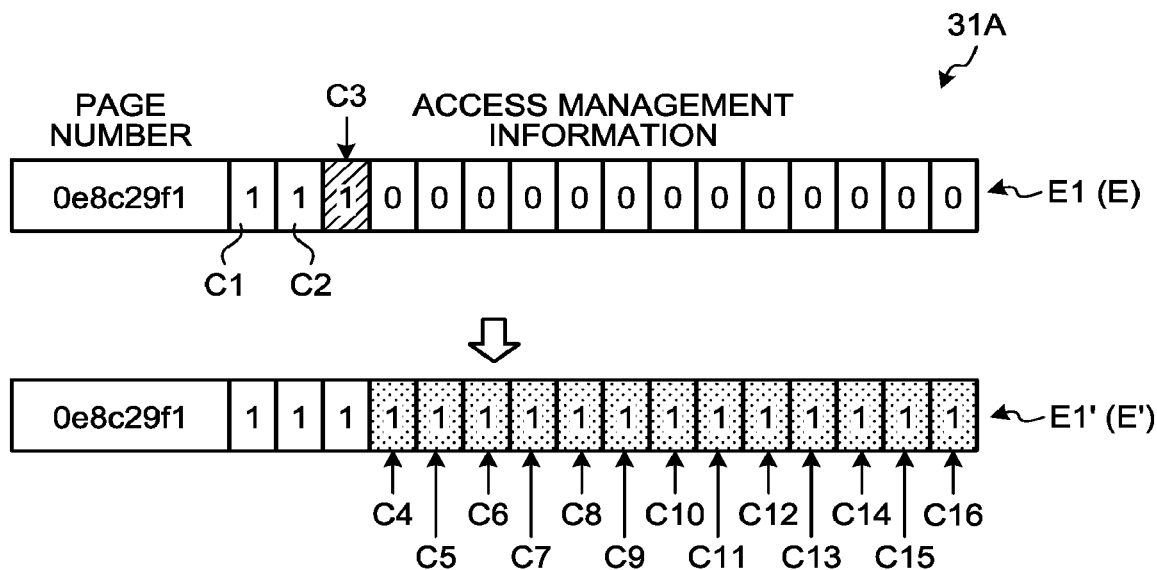
FIG. 11 is an explanatory diagram of prediction of a second region.
Figure 12:
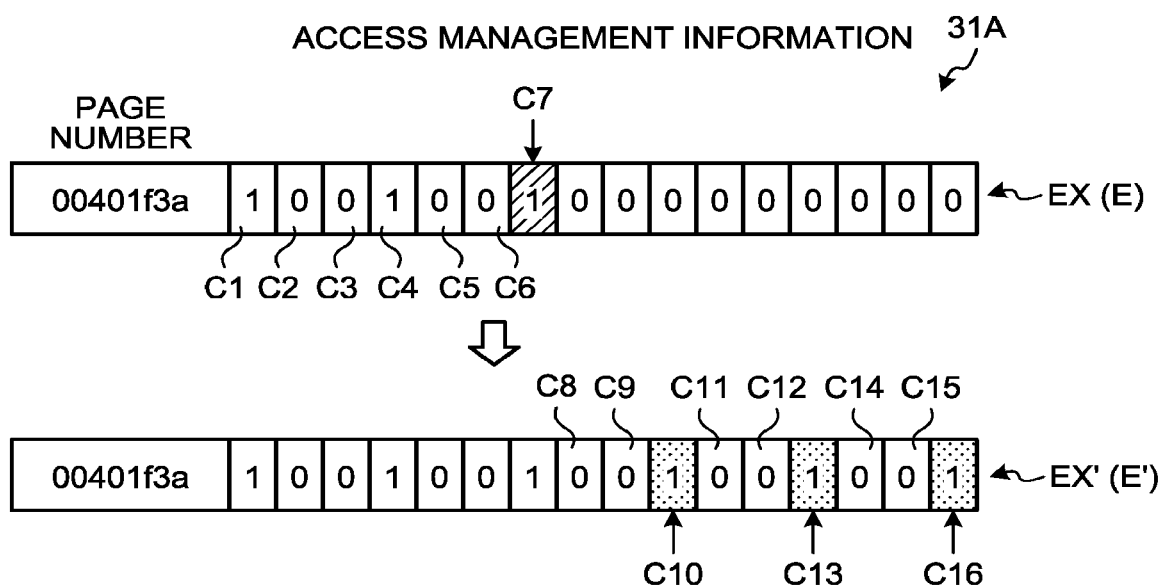
FIG. 12 is an explanatory diagram of prediction of a second region.

FIGS. 11 and 12 are explanatory diagrams of an example of prediction of the second region to be accessed in the future.

As illustrated in FIG. 11, for example, it is assumed that the access information of the second region C3, which is the third from the leading address, within the first region in which the page number is defined in the entry E1 has been updated by the updating unit 240. At this time, it is assumed that the access information is consecutively the accessed "1" from the leading second region C1 to the recently updated second region C3.

In this case, the prediction unit 260 specifies a pattern in which the accessed "1" is consecutively arranged from the leading second region C1 to the recently updated second region C3. Then, the prediction unit 260 predicts that the same pattern as the specified pattern is also indicated in the address information of the second region after the second region C3. That is, the prediction unit 260 predicts that the accessed "1" is consecutively arranged at the same interval as the specified pattern in another second region (the second region C4 to the second region C16) consecutive to the second region C3. For this reason, the prediction unit 260 predicts the second region C4 to the second region C16 in the entry E1 as the second region to be accessed in the future by the processing circuit 12.

Then, the prediction unit 260 updates the access information of the predicted second region to the accessed "1". The access management information of the entry E' after the prediction is, for example, in a state illustrated in FIG. (see an entry E1' in FIG. 11).

In addition, FIG. 11 illustrates a case where the prediction unit 260 predicts all the second regions (the second region C4 to the second region C16) consecutive to the second region C3 which has been recently updated in the entry E1 as the second region to be accessed in the future.

However, the number of second regions predicted by the prediction unit 260 is not limited. For example, the prediction unit 260 may predict only one second region C4 adjacent to the second region C3, which has been recently updated by the updating unit 240 as the second region to be accessed in the future by the processing circuit 12. In addition, the prediction unit 260 may predict a predetermined number of second regions (for example, the second region C4 to the second region C5) adjacent to the second region C3 as the second region to be accessed in the future by the processing circuit 12. In addition, the prediction unit 260 may predict the second region to be accessed in the future by the processing circuit 12 over a plurality of the first regions.

In addition, as illustrated in FIG. 12, it is assumed that the access information of the second region C7 which is the seventh region from the leading address in the first region in which the page number is defined in the entry EX of the management table 31A is updated by the updating unit 240. At this time, it is assumed that the access information is the accessed "1" for every two pieces of access information from the leading second region C1 to the recently updated second region C7.

In this case, the prediction unit 260 specifies a pattern in which the accessed "1" is arranged for every two second regions from the leading second region C1 to the recently updated second region C7. Then, the prediction unit 260 predicts that the pattern similar to the specified pattern is also indicated in the address information of the second region subsequent to the second region C7. That is, the prediction unit 260 predicts that the accessed "1" for every two second regions is arranged at the same intervals as the specified pattern in the other second regions (the second region C8 to the second region C16) consecutive to the second region C7. For this reason, in this case, the prediction unit 260 predicts the second region C10, the second region C13, and the second region C16 in the entry EX as the second region to be accessed in the future.

Then, the prediction unit 260 updates the predicted access information of the second region to the accessed "1". The access management information of the entry E' after the prediction is, for example, in the state illustrated in FIG. 12 (see entry EX' in FIG. 12).

In addition, for example, the prediction unit 260 may predict the second region to be accessed in the future by the processing circuit 12 according to the pattern indicated by the access information updated in a certain period in the access management information. The certain period is a period from a reference timing at which the updating unit 240 updates the access information to the timing after a predetermined time is traced backward. The certain period may be determined in advance.

Figure 13:
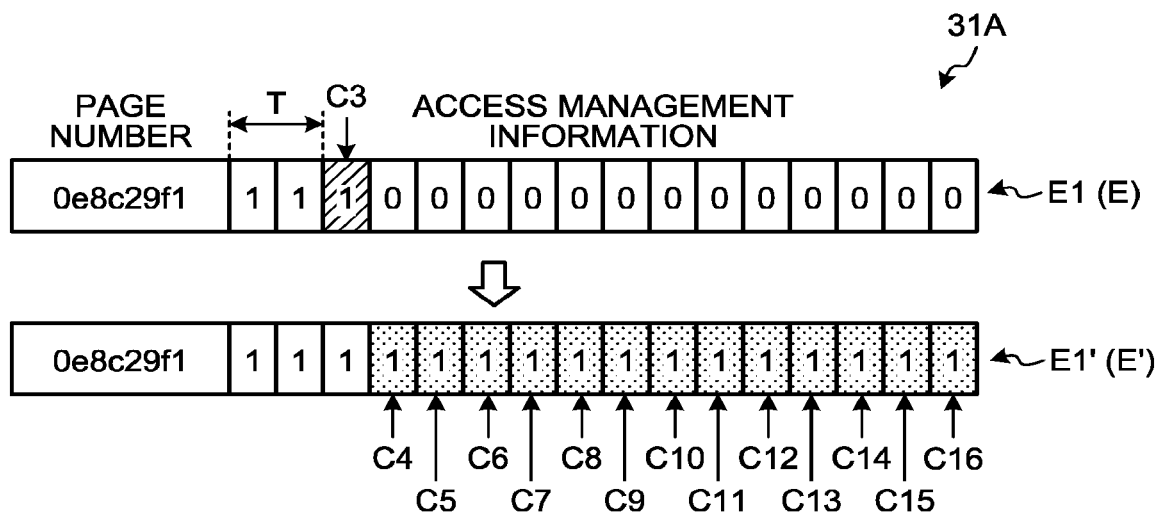
FIG. 13 is an explanatory diagram of prediction of a second region.
Figure 14:
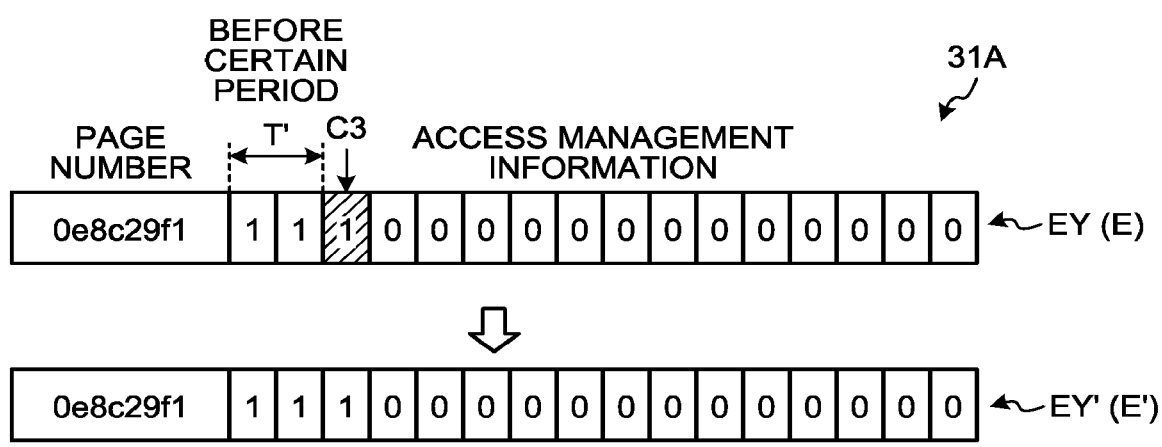
FIG. 14 is an explanatory diagram of prediction of a second region.

FIGS. 13 and 14 are explanatory diagrams of an example of prediction of the second region to be accessed in the future.

As illustrated in FIG. 13, for example, it is assumed that the updating unit 240 updates the access information of the second region C3, which is the third region from the leading address, within the first region in which the page number is defined in the entry E1. At this time, it is assumed that the leading second region C1 and the next second region C2 are updated to the accessed "1" within a certain period T traced backward from the update timing of the second region C3.

In this case, the prediction unit 260 specifies the pattern in which the accessed "1" is consecutively arranged as a pattern represented by the access information updated within the immediately previous certain period T. Then, the prediction unit 260 predicts that the same pattern as the specified pattern is also indicated in the address information of the second regions after the second region C4. That is, the prediction unit 260 predicts that accessed "1" is consecutive at the same interval as the specified pattern in the other second regions (the second region C4 to the second region C16) consecutive to the second region C3. For this reason, the prediction unit 260 predicts the second region C4 to the second region C16 in the entry E1 as the second region to be accessed in the future.

Then, the prediction unit 260 updates the predicted access information of the second region to the accessed "1". The access management information of the entry E' after the prediction is, for example, in the state illustrated in FIG. 13 (see entry E1' in FIG. 13).

In addition, in a case where there is no access information updated in a certain period, the prediction unit 260 may not perform the prediction.

For example, as illustrated in FIG. 14, it is assumed that, for example, the access information of the second region C3, which is the third region from the leading address, within the first region in which the page number is defined in the entry EY is updated by the updating unit 240. At this time, it is assumed that the leading second region C1 and the next second region C2 are updated to the accessed "1" during the period T' of the timing before (prior to) the certain period T instead of the certain period T traced backward from the update timing of the second region C3.

In this case, the prediction unit 260 grasps the access to the second region C1 and the second region C2 by the processing circuit 12 and the access to the second region C3 this time as separate events. Then, with respect to the ones subsequent to the second region C4 of the entry EY, at this time, the prediction unit 260 does not perform the prediction as the second region to be accessed in the future. For this reason, in this case, as illustrated in FIG. 14, the access management information of the entry EY' after the prediction has the same contents as that of the entry EY before the prediction.

On the other hand, in the case of performing the prediction every predetermined period, the prediction unit 260 may perform the prediction in the following method by using the pattern indicated by the access information.

For example, according to the number of second regions updated to the accessed "1" within a certain period in the management table 31A, the prediction unit 260 predicts, as the second region to be accessed in the future, the second regions whose number is equal to or close to the above-mentioned number.

Herein, the prediction unit 260 may specify a plurality of certain periods with respect to the access management information in the management table 31A and may predict the second region to be accessed in the future by using the pattern indicated by the access information of the certain period every specified certain period.

For example, the prediction unit 260 predicts the second region to be accessed in the future by the processing circuit 12 by using the pattern indicated by the access information updated in the first period in the access management information of the management table 31A with priority to the pattern indicated by the access information updated in the second period at a timing before the first period.

In addition, the prediction unit 260 specifies a period of time during which more access information is updated to the accessed "1" within a unit time of the first period and the second period. Then, the prediction unit 260 may predict the second region to be accessed in the future by using the pattern indicated by the access information in the specified period (the first period or the second period) with a priority.

In addition, the phrase "using with a priority" denotes that prediction or prediction and transfer of data in the predicted second region to another storage unit 14 is executed with a priority. In addition, the phrase "using with a priority" may denote that only the one with a higher priority is predicted and the one with a lower priority is not predicted. In addition, the phrase "using with a priority" may denote that only the one with a higher priority is predicted and data-transferred and the one with a lower priority is not predicted and data-transferred. In addition, the transfer of the data in the predicted second region is performed by the transfer unit 280 described later (described later in detail).

Figure 15:
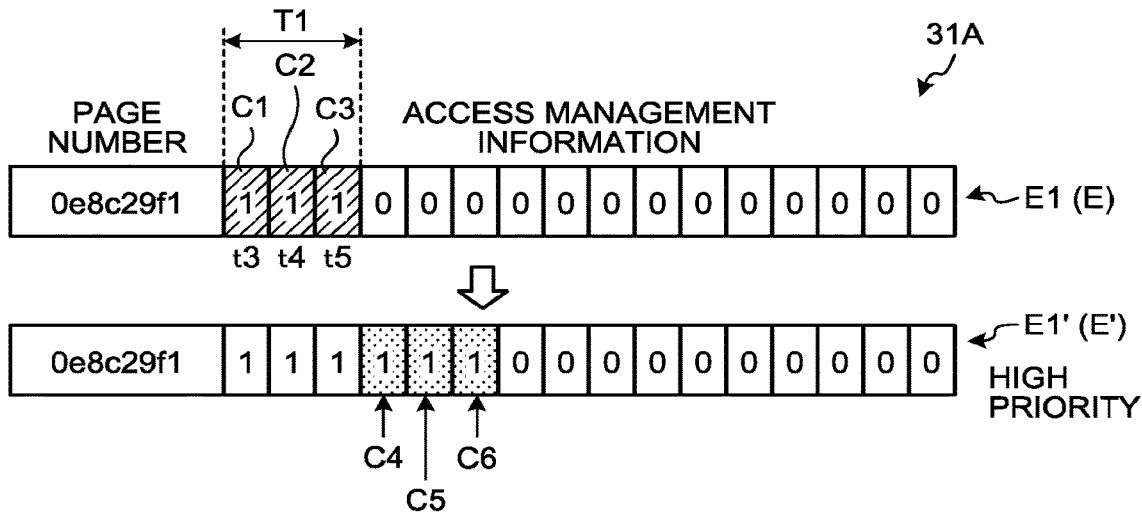
FIG. 15 is an explanatory diagram of prediction of a second region.
Figure 16:
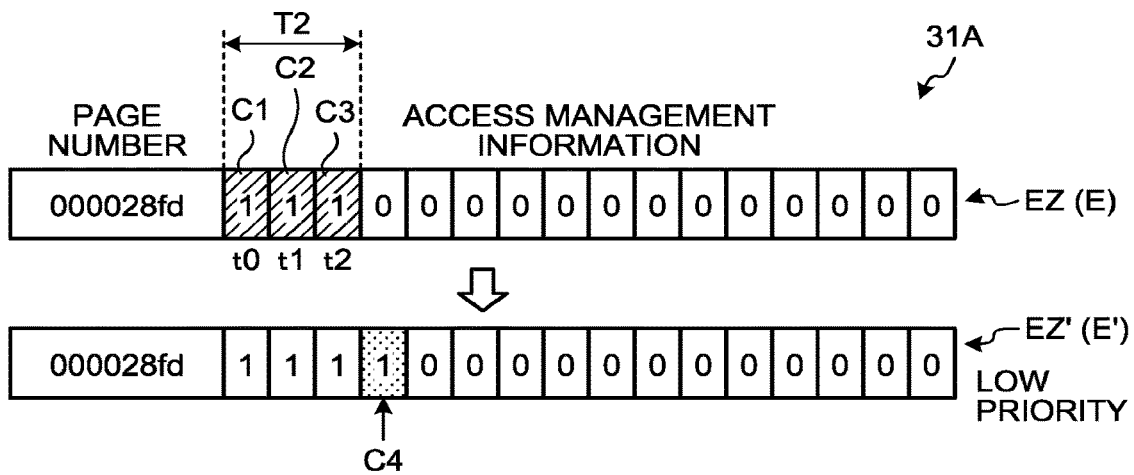
FIG. 16 is an explanatory diagram of prediction of a second region.
Figure 17:
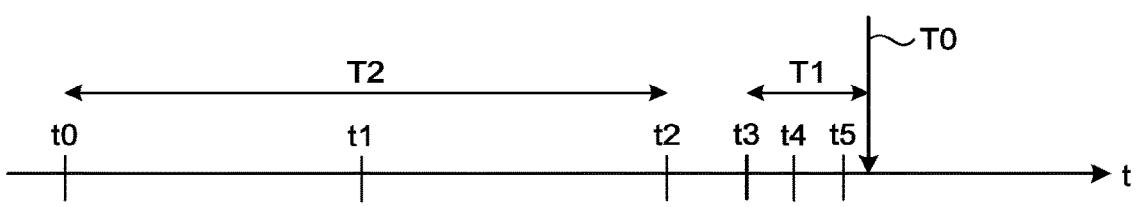
FIG. 17 is an explanatory diagram of prediction of a second region.

This will be specifically described with reference to FIGS. 15 to 17. FIGS. 15 to 17 are explanatory diagrams of an example of prediction of the second region to be accessed in the future.

As illustrated in FIG. 15, for example, it is assumed that the access information of the second region C1 to the second region C3 within the first region in which the page number is specified in the entry E1 of the management table 31A has been updated to the accessed "1" within the first period T1. In addition, it is assumed that the timing at which the access information of each of the second region C1 to the second region C3 is updated to the accessed "1" is the timing t3 to t5 within the first period T1.

On the other hand, as illustrated in FIG. 16, it is assumed that the access information of the second region C1 to the second region C3 within the first region in which the page number is defined in the entry EZ of the management table 31A has been updated to the accessed "1" within the second period T2. In addition, it is assumed that the timing at which the access information of each of the second region C1 to the second region C3 is updated to the accessed "1" is the timing t0 to t2 within the second period T2.

In addition, these timings t0 to t5 are represented by the time series illustrated in FIG. 17. That is, the timing t0 is the oldest and is closer to the current timing T0 toward the timing t5. In addition, the second period represented by timings t0 to t2 is longer than the first period represented by timings t3 to t5. For this reason, the number of times of updating of the access information per unit time in the first period T1 is larger than the number of times of updating in the second period T2. In addition, the second period T2 is a timing before the first period T1.

In this case, first, the prediction unit 260 specifies a pattern indicated by the access information updated during each of the periods with respect to each of the first period T1 and the second period T2 in the access management information of the management table 31A. Then, the prediction unit 260 predicts the second region to be accessed in the future by using the pattern indicated by the access information in the first period T1 with a priority to the pattern indicated by the access information in the second period T2.

Specifically, as illustrated in FIG. 15, according to the pattern indicated by the access information of the second region C1 to the second region C3 updated in the first period T1 in the entry E1, the prediction unit 260 predicts the three second regions C4 to C6 adjacent to the second region C3 as the second region to be accessed in the future.

Then, the prediction unit 260 updates the predicted access information of the second region to the accessed "1". The access management information of the entry E1' after the prediction is in the state illustrated in FIG. 15 (see entry E1' in FIG. 15).

Next, as illustrated in FIG. 16, according to the pattern indicated by the access information of the second region C1 to the second region C3 updated in the second period T2 in the entry EZ, the prediction unit 260 predicts the second region C4 adjacent to the second region C3 as the second region to be accessed in the future.

Then, the prediction unit 260 updates the predicted access information of the second region to the accessed "1". The access management information of the entry EZ' after the prediction is in the state illustrated in FIG. 16 (see entry EZ' in FIG. 16).

In addition, the prediction unit 260 may not use the access information in the second period T2 with a low priority as a pattern used for the prediction. In this case, the prediction unit 260 may not predict the second region to be accessed in the future for the entry EZ illustrated in FIG. 16.

In addition, for example, the prediction unit 260 may predict the second region to be accessed in the future with respect to the second region in the first region in which the data is stored in a type of the storage unit 14 whose access speed by the processing circuit 12 is lower than the first speed among the first regions identified by each of the plurality of page numbers illustrated in the management table 31A, with a priority to the first region in which the data is stored in another type of the storage unit 14 whose access speed is the first speed or more.

The prediction (or the prediction and the transfer) is performed before the processing circuit 12 access the data in the second region stored in the storage unit 14 having a lower access speed with a priority to the data in the second region stored in the storage unit 14 with a higher access speed, so that it is possible to obtain a higher reduction effect for the stall time by the processing circuit 12.

The first speed may be determined in advance. In the present embodiment, it is assumed that the access speed of the first storage unit 14A is equal to or higher than the first speed, and the access speed of the second storage unit 14B is lower than the first speed.

For example, the prediction unit 260 may predict the second region to be accessed in the future with respect to the second region in the first region in which the data is stored in the second storage unit 14B with a priority to the first region in which the data is stored in the first storage unit 14A.

Figure 18:
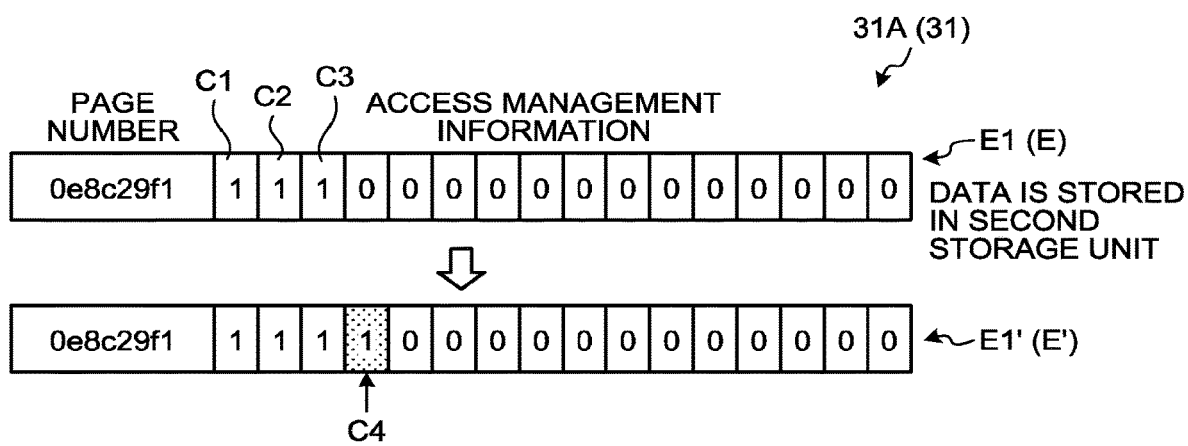
FIG. 18 is an explanatory diagram of prediction of a second region.
Figure 19:
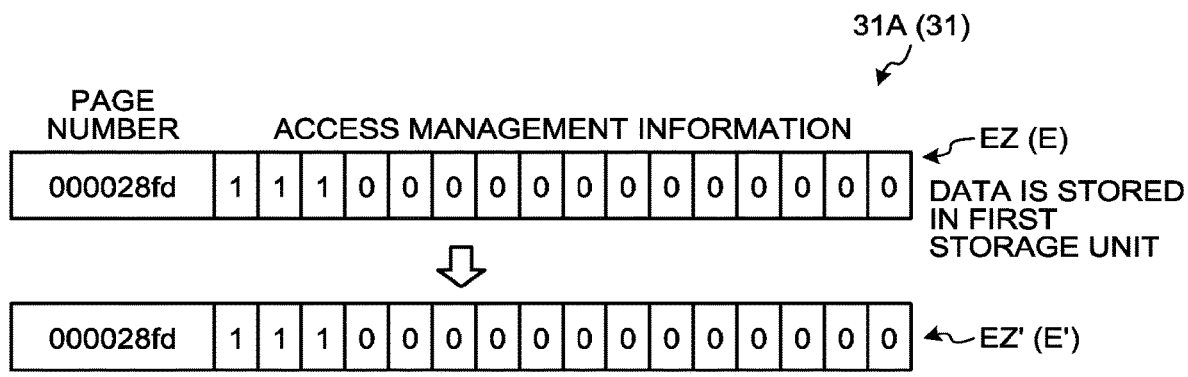
FIG. 19 is an explanatory diagram of prediction of a second region.

FIGS. 18 to 20 are explanatory diagrams of an example of prediction of the second region to be accessed in the future.

As illustrated in FIG. 18, for example, it is assumed that the data in the first region in which the page number is defined in the entry E1 of the management table 31A is stored in the second storage unit 14B. In addition, as illustrated in FIG. 19, it is assumed that the data in the first region in which the page number is defined in the entry EZ of the management table 31A is stored in the first storage unit 14A.

In this case, as illustrated in FIG. 18, the prediction unit 260 predicts the second region C4 of the entry E1 as the second region to be accessed in the future by using the access management information of the entry E1 defining the page number of the first region in which the data is stored in the second storage unit 14B (see entry E1' in FIG. 18). Note that, the method of predicting the second region to be accessed in the future from the access management information is the same as above.

Next, as illustrated in FIG. 19, the prediction unit 260 predicts the second region of the entry EZ as the second region to be accessed in the future by using the access management information of the entry EZ defining the page number of the first region in which data is stored in the first storage unit 14A. In addition, the prediction unit 260 may not perform the prediction of the second region to be accessed in the future for the entry EZ defining the first region in which the data is stored in the first storage unit 14A having a low priority. In this case, as illustrated in FIG. 19, the entry EZ' after the prediction has the same content as the entry EZ before the prediction.

Note that, in a case where the prediction unit 260 predicts the second region to be accessed in the future on the basis of the priority according to the storage unit 14 in which the data is stored, it is preferable that the management table 31B (see FIG. 10) is used as the management table 31.

FIG. 20 is an explanatory diagram of prediction using the management table 31B. In this case, the prediction unit 260 can easily search the entries E (entry Ea, entry Eb, entry Ec, and entry Ed) indicating the physical address of the second storage unit 14B from the management table 31B. For this reason, the prediction unit 260 can easily specify the entry E defining the page number of the first region in which the data is stored in the second storage unit 14B and can use the entry E for prediction of the second region to be accessed in the future.

Returning to FIG. 8, the description will be continued. Next, the transfer unit 280 will be described. The transfer unit 280 transfers the data in the second region predicted by the prediction unit 260 to another type of the storage unit 14 whose access speed by the processing circuit 12 is higher than that of the storage unit 14 in which the data is stored. In addition, in the present embodiment, "transfer" may denote copying or may denote moving to delete original data.

For example, it is assumed that data in the second region predicted to be accessed in the future is stored in the first storage unit 14A. In this case, the transfer unit 280 transfers the data in the second region stored in the first storage unit 14A to the cache memory 16.

In addition, for example, it is assumed that data in the second region predicted to be accessed in the future is stored in the second storage unit 14B. In this case, the transfer unit 280 transfers the data in the second region stored in the second storage unit 14B to the first storage unit 14A or the cache memory 16.

The basic unit of data transfer from the second storage unit 14B to the first storage unit 14A is a page (that is, a unit of the first region). For this reason, in a case where the transfer destination is the first storage unit 14A, the transfer unit 280 transfers the data of the first region (page) including data (cache line) in the second region to the first storage unit 14A.

On the other hand, the basic unit of data transfer from the second storage unit 14B or the first storage unit 14A to the cache memory 16 is a unit of a cache line (that is, a unit of the second region). For this reason, in a case where the transfer destination is the cache memory 16, the transfer unit 280 transfers the data of the second region to the cache memory 16 in unit of a cache line.

The timing at which the transfer unit 280 transfers data in the predicted second region is not limited. For example, every time a new second region is predicted by the prediction unit 260, the transfer unit 280 transfers the data in the second region to the storage unit 14 or the cache memory 16 having a higher access speed.

In addition, the transfer unit 280 may transfer the data within the predicted second region to the storage unit 14 or the cache memory 16 having a higher access speed at predetermined time intervals or at a predetermined timing after a predetermined time elapses from the last prediction by the prediction unit 260. For example, the transfer unit 280 may transfer the data during a period when access to the storage unit 14 by the processing circuit 12 is small.

In a case where the transfer unit 280 transfers the data from the second storage unit 14B to the first storage unit 14A in unit of a page, the physical address corresponding to the logical address of the transferred second region in the page table is updated to the physical address indicating the position in the storage unit 14 of the transfer destination. For this reason, in the case of accessing the data, the processing circuit 12 can directly access the storage unit 14 of the transfer destination. In addition, the updating of the page table may be performed by the prediction unit 260.

Figure 21:
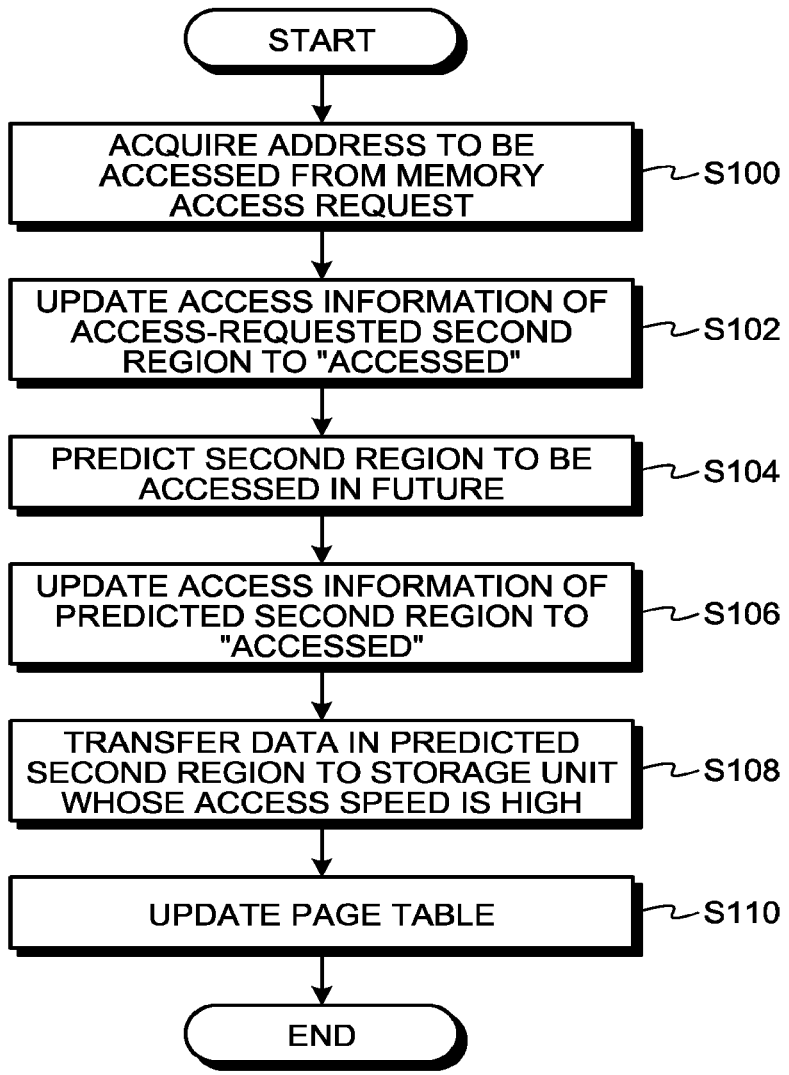
FIG. 21 is a flowchart of an information processing procedure.

Next, an example of an information processing procedure executed by the information processing apparatus 100 according to the present embodiment will be described. FIG. 21 is a flowchart illustrating the example of the information processing procedure executed by the information processing apparatus 100.

First, the updating unit 240 obtains the address to be accessed from the memory access request received from the processing circuit 12 through the access control unit 200 (Step S100).

Next, in the entry E defining the page number indicated by the address information of the address obtained in Step S100 in the management table 31A, the updating unit 240 updates the access information of the second region to be accessed, which is indicated in the memory access request received in Step S100, to the accessed "1" (Step S102).

Next, the prediction unit 260 predicts the second region to be accessed in the future by the processing circuit 12 on the basis of the access management information of the management table 31A (Step S104).

Then, the prediction unit 260 updates the access information of the second region predicted in Step S104 in the management table 31A to the accessed "1" (Step S106).

Next, the transfer unit 280 transfers the data in the second region predicted in Step S104 to another type of the storage unit 14 whose access speed by the processing circuit 12 is higher than that of the storage unit 14 in which the data is stored or the cache memory 16 (Step S108).

Next, in the case of transferring from the second storage unit to the first storage unit, the transfer unit 280 updates the physical address corresponding to the logical address of the second region transferred in Step S108 in the page table to the physical address indicating the storage destination of the storage unit 14 of the transfer destination (Step S110). Then, this routine is ended.

In addition, as described above, in some cases, the prediction unit 260 may predict the second region to be accessed in the future by using the pattern indicated by the access information updated in the first period T1 with a priority to the pattern indicated by the access information updated in the second period T2 at the timing before the first period T1.

In addition, in some cases, the prediction unit 260 predicts the second region to be accessed in the future with respect to the second region in which the data is stored in a type of the second storage unit 14B whose access speed is lower than the first speed with a priority to the second region in which the data is stored in the first storage unit 14A whose access speed is the first speed or more.

In this case, in the information processing apparatus 100, as described above, only the prediction by the prediction unit 260 may be performed with a priority, or the prediction by the prediction unit 260 and the transfer by the transfer unit 280 may be performed with a priority.

In a case where the prediction by the prediction unit 260 and the transfer by the transfer unit 280 are performed with a priority, for example, the second region predicted with a priority by the prediction unit 260 is transferred to the storage unit 14 having a higher access speed with a priority to the second region having a lower priority. Then, when the prediction unit 260 predicts the second region with a low priority, the data of the predicted second region may be transferred to the storage unit 14 with a high access speed.

At this time, in a case where the transfer destination is the cache memory 16, it is preferable that the transfer unit 280 transfers the data of the second region having a higher priority to a higher hierarchy having a higher access speed in the cache memory 16.

As described above, the management apparatus 180 according to the present embodiment manages access to a plurality of types of the storage units 14 by the processing circuit 12. The storage unit 14 includes a plurality of first regions, and the first region includes a plurality of second regions. The management apparatus 180 includes a management unit (management information storage unit 30) and a prediction unit 260. The management unit (management information storage unit 30) manages the management table 31. The management table 31 is a table in which the identification information of the first region and the access management information defining the access information indicating whether or not the second region is accessed by the processing circuit 12 for each of the plurality of second regions included in the first region are associated with each other. The prediction unit 260 predicts the second region to be accessed in the future by the processing circuit 12 on the basis of the access management information.

As described above, in the management apparatus 180 according to the present embodiment, for each of the plurality of types of storage units 14, the access information indicating whether or not each second region which is a unit smaller than the first region has been accessed by the processing circuit 12 is managed. For this reason, for each of the plurality of types of storage units 14, it is possible to easily manage which second region within the first region has been accessed by the processing circuit 12.

The management apparatus 180 according to the present embodiment predicts the second region to be accessed in the future by the processing circuit 12 on the basis of the access management information defining the access information of each of the second regions in the management table 31. For this reason, the management apparatus 180 according to the present embodiment can predict the second region that the processing circuit 12 accesses in the future according to the pattern of access to the second region by the processing circuit 12.

Therefore, the management apparatus 180 can predict data to be accessed in the future by the processing circuit 12 with a high accuracy.

In addition, in the present embodiment, the transfer unit 280 transfers the data in the second region predicted by the prediction unit 260 to another type of the storage unit 14 whose access speed by the processing circuit 12 is higher than that of the storage unit 14 in which the data is stored.

For this reason, in the management apparatus 180 according to the present embodiment, before accessing by the processing circuit 12, the data in the second region predicted to be accessed in the future can be transferred to the storage unit 14 (for example, the first storage unit 14A or the cache memory 16) whose access speed is higher than that of the storage unit 14 (for example, the second storage unit 14B) in which the data is stored.

For this reason, in addition to the above-mentioned effects, the management apparatus 180 according to the present embodiment can improve the access speed by the processing circuit 12, shorten the processing time, improve the processing performance, and reduce the power consumption by shortening the processing time.

In addition, in the management apparatus 180 according to the present embodiment, the access speeds of the plurality of types of storage units 14 are different from each other.

In addition, the prediction unit 260 predicts the second region to be accessed in the future by the processing circuit 12 according to the pattern indicated by the access information. The pattern is represented by a positional relationship in the storage unit 14 of the second region in which the access information indicating the "accessed" is defined.

In addition, when receiving the memory access request from the processing circuit 12, the updating unit 240 of the management apparatus 180 updates the access information of the second region to be accessed, which is indicated in the memory access request, in the management table 31 to the "accessed".

The prediction unit 260 predicts the second region to be accessed in the future by the processing circuit 12 according to the pattern indicated by a plurality of pieces of the access information including the access information which has been recently updated by the updating unit 240 in the access management information.

The prediction unit 260 predicts the second region to be accessed in the future by the processing circuit 12 according to the pattern indicated by the access information updated in a certain period in the access management information.

The prediction unit 260 predicts the second region to be accessed in the future by the processing circuit 12 by using the pattern indicated by the access information updated in the first period in the access management information with a priority to the pattern indicated by the access information updated in the second period at the timing before the first period.

In a case where the identification information of the first region including the predicted second region is not registered in the management table 31, the prediction unit 260 adds a new entry including the identification information of the first region to the management table 31 and registers the identification information and the physical address of the first region in the entry.

Within the first region identified by each of the plurality of pieces of identification information illustrated in the management table 31, with respect to the second region in the first region in which the data is stored in a type of the storage unit 14 whose access speed by the processing circuit 12 is lower than a first speed, with a priority to the first region in which the data is stored in a type of the storage unit 14 whose access speed is the first speed or more, the prediction unit 260 predicts the second region to be accessed in the future by the processing circuit 12.

The prediction unit 260 updates the predicted access information of the second region in the management table 41 to the "accessed".

The transfer unit 280 transfers the data in the second region predicted by the prediction unit 260 to another type of the storage unit 14 whose access speed by the processing circuit 12 is higher than that of the storage unit 14 in which the data is stored.

The plurality of types of storage unit 13 includes a first storage unit 13A and a second storage unit 13B whose access speed is lower than that of the first storage unit 13A. In a case where the access management information corresponding to the identification information of another first region indicating the logical address within the predetermined range with respect to the identification information of the first region to be predicted in the management table satisfies the predetermined condition, the prediction unit 260 predicts the second region to be accessed in the future by the processing circuit 12 on the basis of the access management information corresponding to the identification information. In a case where it is determined that the predetermined condition is satisfied, the transfer unit 280 transfers the data of the first region to be predicted from the second storage unit 14B to the first storage unit 14A in unit of the first region.

In a case where a predetermined ratio or more of the first regions in which the number of second regions defined by the access information indicating the "accessed" is a first threshold value or more is included in other first regions indicating the logical address within a predetermined range with respect to the identification information of the first region to be predicted, the prediction unit 260 determines that the predetermined condition is satisfied.

The plurality of types of storage units 14 include a cache memory 16, a first storage unit 14A whose access speed is lower than that of the cache memory 16, and a second storage unit 14B. In a case where the prediction unit 260 determines that the predetermined condition is satisfied, the transfer unit 280 transfers the data of the second region predicted to be accessed in the future by the processing circuit 12 to the cache memory 16.

In a case where the prediction unit 260 determines that the predetermined condition is not satisfied, the transfer unit 280 directly transfers the data of the second region predicted to be accessed in the future by the processing circuit 12 from the second storage unit 14B to the cache memory 16 in unit of the second region.

The management table 31 is configured by associating, with each other, a logical address as identification information of the first region, a physical address of the first region in the storage unit 14, and access management information defining access information indicating whether or not the second region is accessed by the processing circuit 12 for each of the plurality of second regions included in the first region.

The information processing apparatus 100 according to the present embodiment includes a processing circuit 12, a plurality of types of storage units 14, and a management apparatus 180 that manages access to the plurality of types of storage units 14.

Modified Example 4

In addition, the prediction unit 260 may predict the second region to be accessed in the future on the basis of the access management information of the management table 31, and the prediction method by the prediction unit 260 may not be limited to the method described in the above-described embodiment.

For example, the prediction unit 260 may predict the second region in each of the plurality of first regions adjacent to the logical address (page number) as the second region to be accessed in the future.

Herein, in some cases, the page number of the first region including the second region predicted to be accessed in the future may not be registered in the management table 31. In this case, the prediction unit 260 may add a new entry E defining the page number of the first region including the second region predicted to be accessed in the future in the management table 31.

Figures 22, 23:
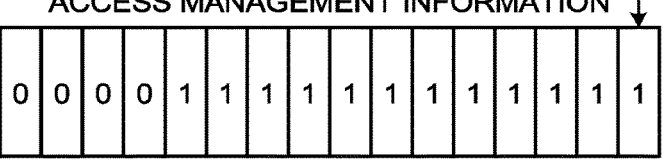
FIG. 22 is an explanatory diagram of prediction of a second region according to a fourth modified example.
FIG. 23 is an explanatory diagram of prediction of a second region according to a fourth modified example.

FIGS. 22 and 23 are explanatory diagrams of an example of prediction of the second region according to a fourth modified example. Note that, in the present modified example, a case where the management table 31B (see FIG. 10) is used as the management table 31 will be described.

For example, as illustrated in FIG. 22, it is assumed that the access information of the second region C16, which is the 16th region from the leading address, in the first region in which the page number is defined in the entry $E_Z$ is updated by the updating unit 240.

Then, as illustrated in FIG. 23, it is assumed that the prediction unit 260 predicts the second region C1 in the first region of the next page number "0f064382" with respect to the page number "0f064381" of the first region defined in the entry Ez as the second region to be accessed in the future.

In this case, the prediction unit 260 generates a new entry $E_{Z+1}$ (hereinafter, sometimes referred to as a new entry $E_{Z+1}$) and registers the entry in the management table 31B. Herein, the number of entries registered in the management table 31B has an upper limit. For this reason, in a case where there is no empty entry E in the management table 31B, the prediction unit 260 may release any entry E registered in the management table 31B and register the new entry $E_{Z+1}$. The releasing of the entry E may be performed in the same method as the releasing of the entry E by the updating unit 240.

Then, the prediction unit 260 registers the logical address which is the page number of the first region including the second region predicted to be accessed in the future in the new entry $E_{Z+1}$ in the management table 31B. In addition, the prediction unit 260 searches the page table for the physical address corresponding to the logical address and registers the physical address in the new entry $E_{Z+1}$.

As described above, the prediction unit 260 registers the new entry of the second region newly predicted in the management table 31B (see FIG. 10) for collectively managing the management table 31A (see FIG. 3) and the TLB functioning as the cache of the page table, and the prediction unit 260 registers the logical address and the physical address in the new entry $E_{Z+1}$.

For this reason, when the processing circuit 12 accesses the data in the second region, it is avoided that the corresponding entry E does not exist in the management table 31B also having a function as the TLB, and thus, it is possible to suppress the occurrence of TLB miss.

Next, the prediction unit 260 updates the access information of the second region C1 predicted to be accessed in the future in the new entry $E_{z11}$ to the accessed "1".

Then, similarly to the above-described embodiment, the transfer unit 280 transfers the data in the second region predicted by the prediction unit 260 to the cache memory 16. In addition, the transfer unit 280 may transfer the data to another type of storage unit 14 (for example, the first storage unit 14A) whose access speed by the processing circuit 12 is higher than that of the storage unit 14 in which the data is stored.

Then, the transfer unit 280 updates the physical address corresponding to the transferred logical address of the second region in the page table to the physical address indicating the storage destination of the storage unit 14 of the transfer destination. At this time, in a case where the transfer destination is the cache memory 16, it is unnecessary to update the page table.

Figure 24:
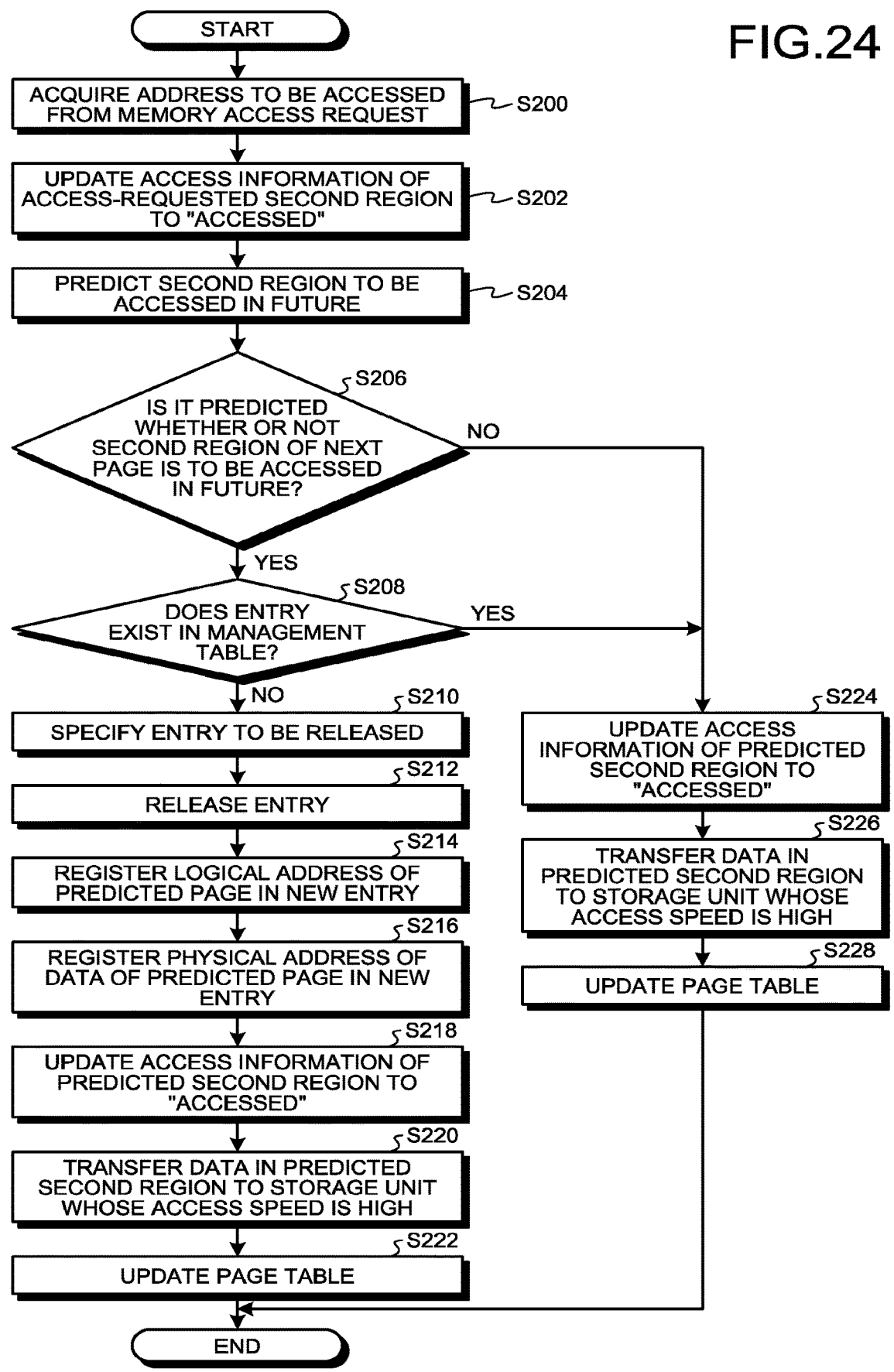
FIG. 24 is a flowchart of an information processing procedure.

Next, an example of an information processing procedure executed by the information processing apparatus 100 according to the present modified example will be described. FIG. 24 is a flowchart illustrating the example of the information processing procedure executed by the information processing apparatus 100 according to the present modified example.

First, the updating unit 240 obtains the address to be accessed from the memory access request received from the processing circuit 12 through the access control unit 200 (Step S200).

Next, in the entry E defining the page number indicated by the address information of the address obtained in Step S200 in the management table 31A, the updating unit 240 updates the access information of the second region to be accessed, which is indicated in the memory access request received in Step S200, to the accessed "1" (Step S202).

Next, the prediction unit 260 predicts the second region to be accessed in the future by the processing circuit 12 on the basis of the access management information of the management table 31B (Step S204).

Next, the prediction unit 260 determines whether or not the second region predicted in Step S204 is the second region within the first region identified by the next page number of the first region to be accessed, which is indicated in the memory access request acquired in Step S200 (Step S206).

If an affirmative determination is made in Step S206 (Step S206: Yes), the process proceeds to Step S208.

In Step S208, it is determined whether or not the entry E defining the page number of the first region including the second region predicted in Step S204 is registered in the management table 31B (Step S208). If it is determined that the entry is not registered (Step S208: No), the process proceeds to Step S210.

In Step S210, the prediction unit 260 specifies the entry E to be released in the management table 31B (Step S210) and releases the entry E (Step S212).

Next, the prediction unit 260 generates a new entry $E_{Z+1}$ in the management table 31B and registers the logical address (page number) of the first region including the second region predicted to be accessed in the future in Step S204 (Step S214). Next, the prediction unit 260 searches the page table for the physical address corresponding to the logical address and registers the physical address in the new entry $E_{Z+1}$ (Step S216).

Next, the prediction unit 260 updates the access information of the second region predicted to be accessed in the future in Step S206 in the new entry $E_{Z+1}$ to the accessed "1" (Step S218).

Next, the transfer unit 280 transfers the data in the second region predicted in Step S206 to another type of the storage unit 14 whose access speed by the processing circuit 12 is higher than that of the storage unit 14 in which the data is stored or the cache memory 16 (Step S220).

Then, the transfer unit 280 updates the physical address corresponding to the transferred logical address of the second region in the page table to the physical address indicating the storage destination of the storage unit 14 of the transfer destination (Step S222). Then, this routine is ended. In addition, the updating of the page table need not be performed at this timing, but the updating may be performed at other timings.

On the other hand, in a case where a negative determination is made in Step S206 (Step S206: No), the process proceeds to Step S224. Even in a case where an affirmative determination is made in Step S208 (Step S208: Yes), the process proceeds to Step S224.

In Step S224, the prediction unit 260 updates the access information of the second region predicted in Step S204 in the management table 31B to the accessed "1" (Step S224).

Next, the transfer unit 280 transfers the data in the second region predicted in Step S206 to another type of the storage unit 14 whose access speed by the processing circuit 12 is higher than that of the storage unit 14 in which the data is stored or the cache memory 16 (Step S226).

Next, the transfer unit 280 updates the physical address corresponding to the logical address of the second region transferred in Step S226 in the page table to the physical address indicating the storage destination of the storage unit 14 of the transfer destination (Step S228). Then, this routine is ended.

As described above, in the present modified example, in a case where the page number of the first region including the second region predicted to be accessed in the future is not registered in the management table 31B, the prediction unit 260 adds a new entry E defining the page number of the first region including the second region predicted to be accessed in the future to the management table 31B. Then, the prediction unit 260 registers the logical address and the physical address in the new entry E.

For this reason, when the processing circuit 12 accesses the data in the second region, it is avoided that the corresponding entry E does not exist in the management table 31B also having a function as the TLB, and thus, it is possible to suppress the occurrence of TLB miss.

Therefore, in the present modified example, in addition to the effects of the above-described embodiment, the stall time of the processing circuit 12 can be shortened, and thus, the access speed can be increased.

Modified Example 5

In addition, the prediction unit 260 may predict the second region to be accessed in the future by the processing circuit 12 with respect to the first region to be predicted on the basis of the access management information corresponding to identification information (page number) of another first region indicating a logical address (page number) within a predetermined range with respect to the logical address (page number) of the first region to be predicted.

That is, the prediction unit 260 may predict the second region to be accessed in the future by the processing circuit 12 on the basis of the access management information corresponding to the identification information of another first region indicating the logical address within the predetermined range with respect to the identification information of the first region to be predicted in the management table.

The first region to be predicted is the first region in which the second region to be accessed in the future by the processing circuit 12 is to be predicted. The first region to be predicted is not limited. For example, the first region to be predicted is the first region in which the page number is defined in the entry E newly added to the management table 31B. In addition, the first region to be predicted is not limited to the entry E newly added.

The logical address within the predetermined range may be a logical address of a page adjacent to the first region to be predicted or may be a logical address within the predetermined range with respect to a logical address of a first region to be predicted. The predetermined range denotes that the difference between the page numbers is equal to or less than a predetermined value or the like.

In addition, another first region indicating the logical address within the predetermined range may be the first region in which the data is stored in the same storage unit 14 as the data in the first region to be predicted and which indicates a logical address within a predetermined range with respect to the logical address of the first region to be predicted.

FIGS. 25 and 26 are exemplary diagrams of an example of prediction of the second region to be accessed in the future according to a fifth modified example. FIGS. 25 and 26 illustrate a case where a first region in which a page number is defined in a newly registered new entry Ej is used as a first region for which a second region is to be predicted.

For example, as illustrated in FIG. 25, it is assumed that the updating unit 240 newly registers the entry Ej with the page number "0f06438c" in the management table 31B on the basis of the memory access request acquired from the processing circuit 12.

In this case, similarly to the above-described embodiment, the updating unit 240 registers the logical address (page number) indicated in the memory access request in the new entry Ej. In addition, the updating unit 240 reads the physical address corresponding to the logical address from the page table and registers the physical address in the entry Ej. In the example illustrated in FIG. 25, a case where the physical address indicates the physical address of the second storage unit 14B will be described as an example.

In addition, similarly to the above-described embodiment, the updating unit 240 updates the access information of the second region to be accessed, which is indicated in the memory access request, in a new entry Ej (hereinafter, may be referred to as a new entry Ej) to the accessed "1".

When the new entry Ej is registered in the management table 31B, the prediction unit 260 specifies another entry E indicating a logical address within a predetermined range with respect to the logical address of the new entry Ej.

In the present modified example, it is assumed that the updating unit 240 specifies the entries Eh1 and Eh2 in which the physical addresses of the storage unit 14 (the second storage unit 14B in FIG. 25) are defined, which are the same as the new entry Ej.

Then, the prediction unit 260 predicts the second region included in the first region of the new entry Ej as the second region to be accessed in the future according to the pattern indicated by the access information of these specified entries E (the entry Eh1 and the entry Eh2).

Specifically, the prediction unit 260 determines whether the access management information of other entries E (entry Eh1 and entry Eh2) indicating logical addresses within a predetermined range satisfies a predetermined condition.

The predetermined condition may be determined in advance. For example, in a case where a predetermined ratio or more of the entries E including the access information indicating the accessed "1", whose number of pieces is the first threshold value or more, is included in the other entries E (the entry Eh1 and the entry Eh2), the prediction unit 260 determines that the predetermined condition is satisfied.

The first threshold value and the predetermined ratio may be determined in advance. For example, it is assumed that the first threshold value is "8". In this case, the access management information of each of the entries Eh1 and Eh2 illustrated in FIG. 25 includes 8 or more pieces of the access information of accessed "1". For this reason, in this case, the prediction unit 260 determines that the predetermined condition is satisfied.

Then, in a case where it is determined that the predetermined condition is satisfied, the prediction unit 260 predicts the second region to be accessed in the future with respect to the second region of the new entry Ej from the pattern indicated by the access information defined in the access management information of these entries E (entry Eh1 and entry Eh2). This prediction method is the same as in the above-described embodiment.

Then, similarly to the above-described embodiment, the prediction unit 260 updates the predicted access information of the second region in the new entry Ej to the accessed "1". For this reason, the new entry Ej updated by the prediction unit 260 is, for example, the entry illustrated in FIG. 26. For example, in the new entry Ej, the access information of the second region C1 is updated to the accessed "1" by the updating unit 240, and at least one of the second regions C2 to C16 is updated to the accessed "1" by the prediction unit 260.

Then, in the present modified example, in a case where the prediction unit 260 determines that the predetermined condition is satisfied, the transfer unit 280 transfers the data of the first region to be predicted from the second storage unit 14B to the first storage unit 14A in unit of a page (in unit of the first region).

That is, it is assumed that the data in the first region indicated by the new entry Ej has been stored in the second storage unit 14B. In this case, for example, the transfer unit 280 transfers the data in the first region indicated by the new entry Ej from the second storage unit 14B to the first storage unit 14A in unit of a page.

In addition, the transfer unit 280 transfers the data of the second region to be accessed in the future predicted by the prediction unit 260 in the new entry Ej to the cache memory 16 in unit of a cache line.

That is, in the present modified example, when the first region defined by the new entry Ej is accessed for the first time, in a case where the access management information of the other accessed entries E (entry Eh1 and entry Eh2) indicating the logical address within the predetermined range satisfies the predetermined condition, the prediction unit 260 predicts that the new entry Ej is also to be accessed a predetermined number of times or more. Then, the transfer unit 280 transfers the data of the new entry Ej from the second storage unit 14B to the first storage unit 14A in unit of a page. At the same time, the transfer unit 280 transfers the data of the second region to be accessed in the future predicted by the prediction unit 260 in the new entry Ej to the cache memory 16 in unit of a cache line.

Then, the transfer unit 280 updates the physical address indicated in the new entry Ej in the management table 31B to the physical address indicating the first storage unit 14A of the transfer destination (see the physical address of the new entry Ej' in FIG. 26). In addition, the transfer unit 280 updates the physical address corresponding to the transferred logical address of the first region in the page table to the physical address of the first storage unit 14A of the transfer destination.

In addition, in a case where the prediction unit 260 determines that the predetermined condition is not satisfied, the transfer unit 280 may transfer the data of the first region including the second region predicted to be accessed in the future to the cache memory 16 in unit of a cache line (in unit of the second region).

Figure 27:
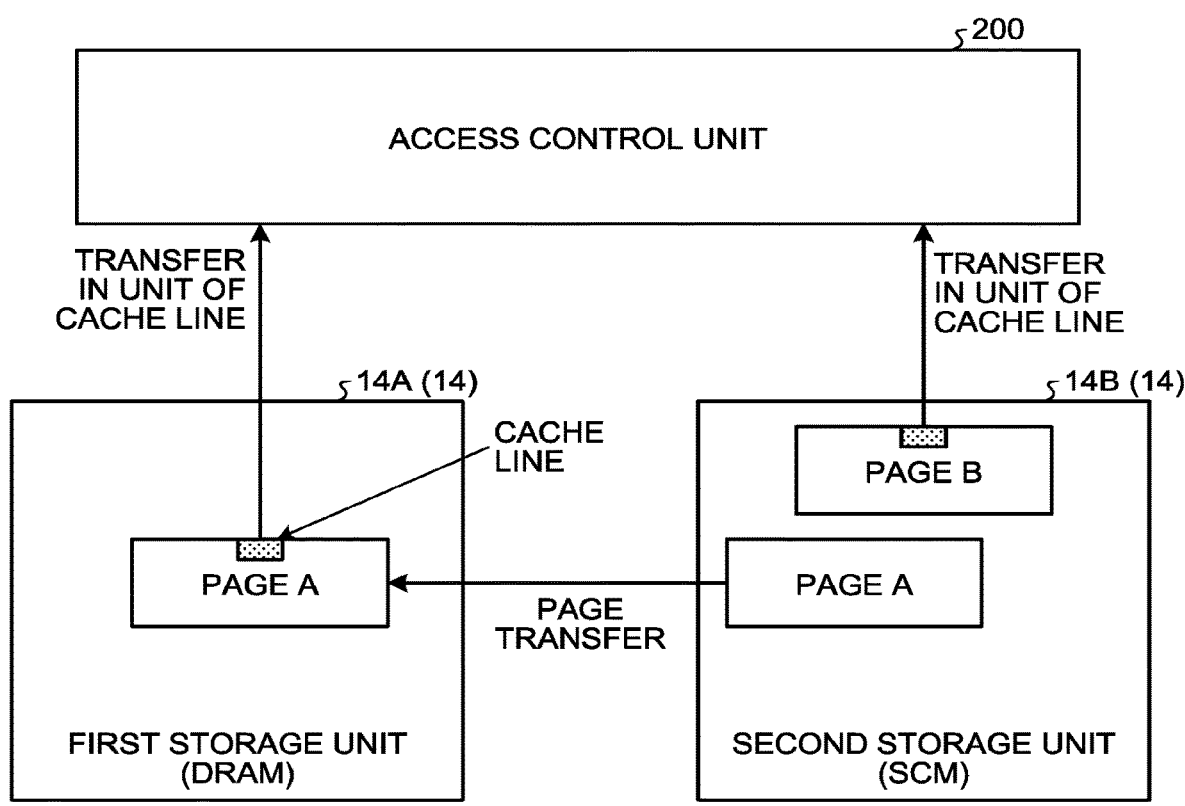
FIG. 27 is an explanatory diagram of data transfer.

FIG. 27 is an explanatory diagram of an example of data transfer in the present modified example. As illustrated in FIG. 27, in the present modified example, with respect to the first region (for example, the page A) defined by the entry predicted to have a high locality of the memory access, the transfer unit 280 transfers the data of the page A from the second storage unit 14B to the first storage unit 14A in unit of a page. In addition, the transfer unit 280 transfers the data of the second region predicted to be accessed in the future in the page A to the cache memory 16 in unit of a cache line.

On the other hand, in the present modified example, with respect to the first region (for example, the page B) defined by the entry predicted to have a low locality of the memory access, the transfer unit 280 transfers the data of the page B from the second storage unit 14B to the cache memory 16 in unit of a cache line.

That is, in the present modified example, the management apparatus 180 properly uses and executes the first process and the second process with respect to the pages A and B on the second storage unit 14B (SCM). In other words, the management apparatus 180 executes the first process and the second process in a mixed manner.

The first process will be described. In the pages A and B on the second storage unit 14B (SCM), the page A whose locality of the memory access is expected to be high is transferred to the first storage unit 14A (DRAM) in unit of a page. Then, in the management table 31B, the access information of the page A transferred to the first storage unit 14A (DRAM) is updated to the access information "1" indicating "accessed" by the access to the page A in unit of a cache line by the processing circuit 12. Then, the prediction unit 260 predicts the second region (cache line) to be accessed in the future by the processing circuit 12 according to the pattern indicated by the access information in the management table 31B. Then, the cache line predicted to be accessed in the future in the page A is transferred to the cache memory 16 in unit of a cache line. This series of processes is referred to as a first process.

The second process will be described. The access information of the page B having a low locality of the memory access which is not transferred to the first storage unit 14A (DRAM) and remains in the second storage unit 14B (SCM) in the management table 31B is updated to the access information "1" indicating the "accessed", by accessing to the page B by the processing circuit 12 in unit of a cache line. Then, the prediction unit 260 predicts the second region (cache line) to be accessed in the future by the processing circuit 12 according to the pattern indicated by the access information in the management table 31B. Then, the cache line predicted to be accessed in the future in the page B is transferred to the cache memory 16 in unit of a cache line. This series of processing is referred to as a second process.

Figure 28:
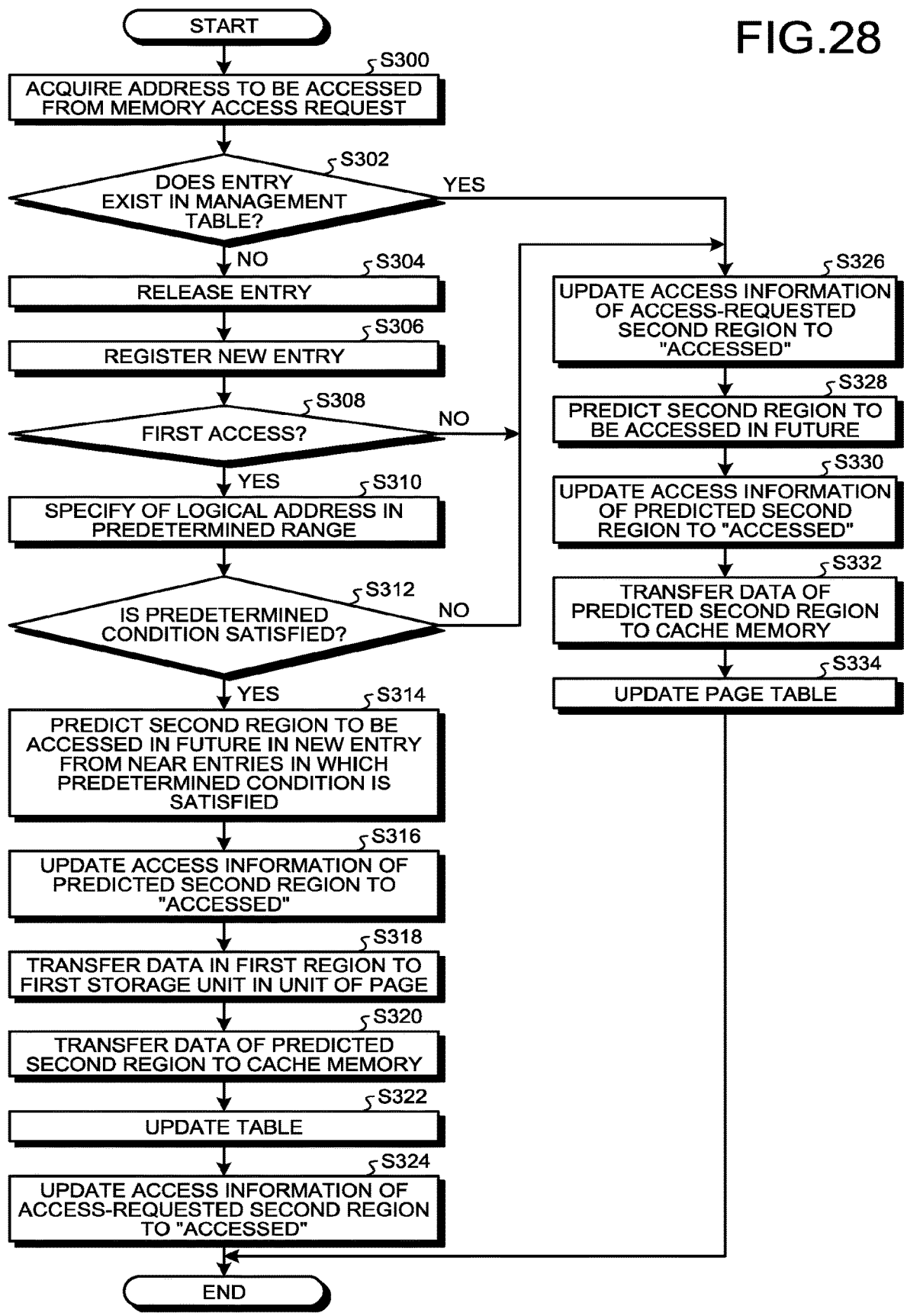
FIG. 28 is a flowchart of an information processing procedure.

Next, an example of an information processing procedure executed by the information processing apparatus 100 according to the present modified example will be described. FIG. 28 is a flowchart illustrating the example of the information processing procedure executed by the information processing apparatus 100 according to the present modified example.

First, the updating unit 240 obtains the address to be accessed from the memory access request received from the processing circuit 12 through the access control unit 200 (Step S300).

Next, the updating unit 240 determines whether or not the entry E including the page number indicated by the address information of the first region indicated in the memory access request received in Step S300 exists in the management table 31B (Step S302).

In a case where the entry E does not exist in the management table 31B (Step S302: No), the process proceeds to Step S304. In Step S304, the updating unit 240 specifies and releases the entry to be released in the management table 30A (Step S304). Then, the updating unit 240 registers the new entry Ej in the management table 31B (Step S306).

Next, the prediction unit 260 determines whether or not the access to the first region (that is, the page) including the second region to be accessed, which is indicated in the memory access request received in Step S300, is the first access to the first region (Step S308). If a negative determination is made in Step S308 (Step S308: No), the process proceeds to Step S326 to be described later. If an affirmative determination is made in Step S308 (Step S308: Yes), the process proceeds to Step S310.

Next, the prediction unit 260 specifies other entries E (entry Eh1 and entry Eh2) indicating a logical address within a predetermined range with respect to the logical address of the new entry Ej (Step S310).

Next, the prediction unit 260 determines whether or not the access management information of these entries E (entry Eh1 and entry Eh2) specified in Step S310 satisfies a predetermined condition (Step S312). In a case where the predetermined condition is not satisfied (Step S312: No), the process proceeds to Step S326 to be described later.

In a case where the predetermined condition is satisfied (Step S312: Yes), the process proceeds to Step S314. In Step S314, the prediction unit 260 predicts the second region to be accessed in the future by the processing circuit 12 with respect to the second region within the first region indicated by the new entry Ej from the access management information of the entry E (entry Eh1 and entry Eh2) specified in Step S310 (Step S314).

Then, the prediction unit 260 updates the access information of the second region predicted in Step S314 in the new entry Ej to the accessed "1" (Step S316).

Next, the transfer unit 280 transfers the data in the first region indicated by the new entry Ej to the first storage unit 14A in unit of a page (Step S318). Next, the transfer unit 280 transfers the data of the second region predicted to be accessed in the future in Step S314 in the data in the first region to the cache memory 16 in unit of a cache line (Step S320).

Next, the transfer unit 280 updates the management table 31B and the page table (Step S322). Specifically, the transfer unit 280 updates the physical address indicated in the new entry Ej in the management table 31B to the physical address indicating the storage unit 14 of the transfer destination (for example, the first storage unit 14A) in Step S318. In addition, the transfer unit 280 updates the physical address corresponding to the transferred logical address of the first region in the page table to the physical address of the storage unit 14 of the transfer destination (for example, the first storage unit 14A) in Step S318.

Next, in the entry E defining the page number indicated by the address information of the address obtained in Step S300 in the management table 31B, the updating unit 240 updates the access information of the second region to be accessed, which is indicated in the memory access request received in Step S300, to the accessed "1" (Step S324). Then, this routine is ended.

On the other hand, if an affirmative determination is made in the Step S302 (Step S302: Yes), the process proceeds to Step S326. In addition, if a negative determination is made in the Step S312 (Step S312: No), the process proceeds to Step S326. The same process as that in Step S324 is performed in Step S326. Next, the prediction unit 260 predicts the second region to be accessed in the future by the processing circuit 12 on the basis of the access management information of the management table 31B (Step S328).

Then, the prediction unit 260 updates the access information of the second region predicted in Step S328 in the management table 31B to the accessed "1" (Step S330).

Next, the transfer unit 280 transfers the data in the second region predicted in Step S328 to the cache memory 16 in unit of a cache line (Step S332). That is, in a case where the prediction unit 260 determines that the predetermined condition is not satisfied, the transfer unit 280 directly transfers the data of the second region predicted to be accessed in the figure by the processing circuit 12 from the second storage unit 14B to the cache memory 16 in unit of a cache line.

Next, the transfer unit 280 updates the physical address corresponding to the logical address of the second region transferred in Step S332 in the page table to the physical address indicating the storage destination of the storage unit 14 of the transfer destination (Step S334). Then, this routine is ended.

As described above, in the present modified example, the prediction unit 260 predicts the second region to be accessed in the future by the processing circuit 12 with respect to the first region to be predicted on the basis of the access management information corresponding to the identification information of another first region indicating the logical address within the predetermined range with respect to the logical address of the first region to be predicted.

Herein, in some cases, the access tendency by the processing circuit 12 between the first regions indicating the logical addresses within the predetermined range may be approximated. In particular, this tendency arises in a case where large data covering a plurality of the first regions is stored in the storage unit 14 or the like.

For this reason, by performing the process of the present modified example, the prediction unit 260 can predict the second region to be accessed in the future by the processing circuit 12 with a higher accuracy in addition to the effects of the above-described embodiment.

Modified Example 6

FIG. 6 is a schematic diagram illustrating an example of an information processing apparatus 100A according to a sixth modified example. As illustrated in FIG. 6, a processing circuit 12A of the information processing apparatus 100A may be configured to include a cache memory 16 and a management apparatus 180. The processing circuit 12A is the same as the processing circuit 12 according to the above-described embodiment except that the processing circuit includes the cache memory 16 and the management apparatus 180.

Modified Example 7

FIG. 7 is a schematic diagram illustrating an example of an information processing apparatus 100B according to a seventh modified example. As illustrated in FIG. 7, a management apparatus 180A may be configured to include a cache memory 16, an access control unit 200, a management unit 220, and a storage unit 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management apparatus for managing access to a plurality of types of storage units by a processing circuit, wherein each of the plurality of types of storage units includes a plurality of first regions, and each of the plurality of first regions includes a plurality of second regions, and the management apparatus comprises a circuitry configured to function as a management unit, and the management unit manages a management table in which identification information of one or more of the plurality of first regions and access management information defining access information indicating whether or not each second region included in the one or more of the plurality of first regions is accessed by the processing circuit are associated with each other.

2. The management apparatus according to claim 1, wherein the management unit includes an updating unit which updates the access information of the second region to be accessed, which is indicated in a memory access request, in the management table to "accessed" when receiving the memory access request from the processing circuit.

3. The management apparatus according to claim 1, wherein the plurality of types of storage units is different from each other in access speed by the processing circuit.

4. The management apparatus according to claim 1, wherein the management unit includes a determination unit which determines a transfer destination of data in the first region identified by the identification information on the basis of the access management information in the management table.

5. The management apparatus according to claim 4, wherein the plurality of types of storage units includes a first storage unit and a second storage unit whose access speed by the processing circuit is lower than that of the first storage unit.

6. The management apparatus according to claim 5, wherein the determination unit determines the first storage unit as a transfer destination of data in the first region identified by the identification information corresponding to the access management information in which the number of pieces of access information indicating "accessed" in the management table is a first threshold value or more.

7. The management apparatus according to claim 5, wherein the determination unit determines the second storage unit as a transfer destination of data in the first region identified by the identification information corresponding to the access management information in which the number of pieces of access information indicating "accessed" in the management table is less than a second threshold value.

8. The management apparatus according to claim 5, wherein
the determination unit determines the first storage unit as a transfer destination of data in the first region identified by the identification information corresponding to the access management information in which the consecutive number of pieces of access information indicating "accessed" in the management table is a third threshold value or more.

9. The management apparatus according to claim 5, wherein
the determination unit determines the storage unit in which the data is stored or another type of the storage unit whose access speed by the processing circuit is lower than that of the storage unit in which the data is stored as a transfer destination of data in the first region identified by the identification information corresponding to the access management information in which the consecutive number of pieces of access information indicating "accessed" in the management table is less than a fourth threshold value.

10. The management apparatus according to claim 4, wherein
the management unit includes a transfer unit which transfers the data in the first region and for which the storage unit is determined as the transfer destination to the storage unit determined by the determination unit.

11. The management apparatus according to claim 1, wherein,
in the management table, a logical address as identification information of the first region, a physical address of the first region in the storage unit, and the access management information defining the access information indicating whether or not the second region is accessed by the processing circuit for each of the plurality of second regions included in the first region are associated with one another.

12. The management apparatus according to claim 1, wherein the first region is a unit of data management by the processing circuit, and
the second region is a unit of data rewriting in the storage unit by the processing circuit.

13. The management apparatus according to claim 1, wherein
the processing circuit is configured to further function as a prediction unit, and
the prediction unit predicts the second region to be accessed in the future by the processing circuit on the basis of the access management information.

14. The management apparatus according to claim 13, wherein
the prediction unit predicts the second region to be accessed in the future by the processing circuit according to a pattern indicated by the access information.

15. The management apparatus according to claim 14, wherein the pattern is represented by a positional relationship in the storage unit of the second region in which the access information indicating "accessed" is defined.

16. The management apparatus according to claim 15, wherein
the management unit includes an updating unit which updates the access information of the second region to be accessed, which is indicated in a memory access request, in the management table to "accessed" when receiving the memory access request from the processing circuit.

17. The management apparatus according to claim 16, wherein
the prediction unit predicts the second region to be accessed in the future by the processing circuit according to the pattern indicated by the plurality of pieces of access information including the access information which has been recently updated by the updating unit in the access management information.

18. An information processing apparatus comprising:
a processing circuit;
a plurality of types of storage units; and
a management apparatus that manages access to the plurality of types of storage units by the processing circuit,
wherein the storage unit includes a plurality of first regions, and each of the plurality of the first regions includes a plurality of second regions, and
the management apparatus includes a management unit which manages a management table in which identification information of the first region and access management information defining access information indicating whether or not each second region included in the one or more of the plurality of first regions is accessed by the processing circuit are associated with each other.

19. A management method in a management apparatus that manages access to a plurality of types of storage units by a processing circuit,
wherein the storage unit includes a plurality of first regions, and each of the plurality of the first regions includes a plurality of second regions, and
the management method comprises a management step of managing a management table in which identification information of the first region and access management information defining access information indicating whether or not each second region included in the one or more of the plurality of first regions is accessed by the processing circuit are associated with each other.

20. A computer program product comprising a non-transitory computer-readable medium that includes a computer program for causing a computer which manages access to a plurality of types of storage units by a processing circuit, wherein
a storage unit includes a plurality of first regions, and each of the plurality of first regions includes a plurality of second regions,
the computer program causing the computer to execute:
managing a management table in which identification information of the first region and access management information defining access information indicating whether or not each second region included in the one or more of the plurality of first regions is accessed by the processing circuit are associated with each other.

* * * * *